United States Patent
McKechnie et al.

(10) Patent No.: US 11,732,470 B2
(45) Date of Patent: Aug. 22, 2023

(54) ACOUSTIC MOUNT

(71) Applicant: STUDCO BUILDING SYSTEMS US, LLC, Webster, NY (US)

(72) Inventors: Simon McKechnie, Croydon South (AU); Benjamin Gordon Stevens, Croydon South (AU)

(73) Assignee: Studco Building Systems US, LLC, Webster, NY (US)

( * ) Notice: Subject to any disclaimer, the term of this patent is extended or adjusted under 35 U.S.C. 154(b) by 176 days.

(21) Appl. No.: 17/254,038

(22) PCT Filed: Jun. 12, 2019

(86) PCT No.: PCT/AU2019/000075
§ 371 (c)(1),
(2) Date: Dec. 18, 2020

(87) PCT Pub. No.: WO2019/241821
PCT Pub. Date: Dec. 26, 2019

(65) Prior Publication Data
US 2021/0270034 A1   Sep. 2, 2021

(30) Foreign Application Priority Data

Jun. 19, 2018 (AU) ................................ 2018902183

(51) Int. Cl.
*E04B 1/98*   (2006.01)
*E04B 1/82*   (2006.01)

(52) U.S. Cl.
CPC .............. *E04B 1/98* (2013.01); *E04B 1/8209* (2013.01); *E04B 2001/8254* (2013.01); *E04B 2001/8263* (2013.01)

(58) Field of Classification Search
CPC .. E04B 1/98; E04B 1/8209; E04B 2001/8254; E04B 2001/8263
See application file for complete search history.

(56) References Cited

U.S. PATENT DOCUMENTS 3,296,759 A * 1/1967 Pavlecka ................ B62D 31/02
  52/234
3,332,170 A * 7/1967 Bangs ................... F25D 23/063
  52/404.1

(Continued)

FOREIGN PATENT DOCUMENTS

WO   WO-2019106116 A1 * 6/2019

*Primary Examiner* — Babajide A Demuren
(74) *Attorney, Agent, or Firm* — Woods Oviatt Gilman LLP; Katherine H. McGuire, Esq.

(57) ABSTRACT

An acoustic mount is described for damping vibrations between a primary structure of a building and a secondary structure of a building and which has a vibration damper interposed in use between the primary and secondary structures. The vibration damper is resiliently compressible in the axial direction and has at least one resiliently compressible damper element which is elongated in the axial direction so that the axial length of the damper element is greater than half of a transverse width thereof. The damper element reduces in cross sectional area in the axial direction; has a convex outer surface in planes containing the axial direction; and possesses non-linear axial deflection or compression characteristics under a range of static loading conditions enabling effective vibration damping or vibration isolation for a substantial range of loadings of the acoustic mount in use. Damper elements have a continuous convexity of outer surface extending to a tip and the continuous convex outer surface in a plane containing the axial direction has a curved shape defined by a quadratic equation, including segments of ellipses, parabolas, hyperbolas.

20 Claims, 23 Drawing Sheets

(56) References Cited

U.S. PATENT DOCUMENTS

| | | | | | |
|---|---|---|---|---|---|
| 3,344,574 | A | * | 10/1967 | Palfey | E04C 2/34 |
| | | | | | 52/562 |
| 3,788,021 | A | * | 1/1974 | Husler | E04B 1/74 |
| | | | | | 52/379 |
| 4,067,163 | A | * | 1/1978 | Hetman | E06B 3/267 |
| | | | | | 52/204.591 |
| 4,110,948 | A | * | 9/1978 | Maier, Jr. | E04D 3/3608 |
| | | | | | 52/489.1 |
| 4,187,573 | A | * | 2/1980 | Fyfe | E01D 19/041 |
| | | | | | 248/580 |
| 5,215,382 | A | * | 6/1993 | Kemeny | E04H 9/022 |
| | | | | | 29/898.15 |
| 5,609,006 | A | * | 3/1997 | Boyer | E04B 2/7457 |
| | | | | | 52/309.7 |
| 6,055,785 | A | * | 5/2000 | Counihan | E04F 15/22 |
| | | | | | 52/480 |
| 6,266,936 | B1 | * | 7/2001 | Gelin | E04B 9/001 |
| | | | | | 52/712 |
| 7,093,814 | B2 | * | 8/2006 | Meisel | F16F 1/44 |
| | | | | | 52/480 |
| 7,303,050 | B2 | * | 12/2007 | Rogger | F16F 1/52 |
| | | | | | 52/301 |
| 2001/0037621 | A1 | * | 11/2001 | Seng | E04C 3/29 |
| | | | | | 52/847 |
| 2008/0017780 | A1 | * | 1/2008 | Downey | F16F 15/00 |
| | | | | | 248/610 |
| 2009/0283359 | A1 | * | 11/2009 | Ravnaas | E04B 9/001 |
| | | | | | 181/286 |
| 2010/0101171 | A1 | * | 4/2010 | Clifton | E04C 2/288 |
| | | | | | 52/588.1 |
| 2014/0318063 | A1 | * | 10/2014 | Case | E04B 1/82 |
| | | | | | 52/309.14 |
| 2014/0318077 | A1 | * | 10/2014 | Case | E04C 3/29 |
| | | | | | 52/843 |
| 2015/0369323 | A1 | * | 12/2015 | Downey | F16F 15/08 |
| | | | | | 248/634 |
| 2018/0180127 | A1 | * | 6/2018 | Downey | E04B 1/98 |

* cited by examiner

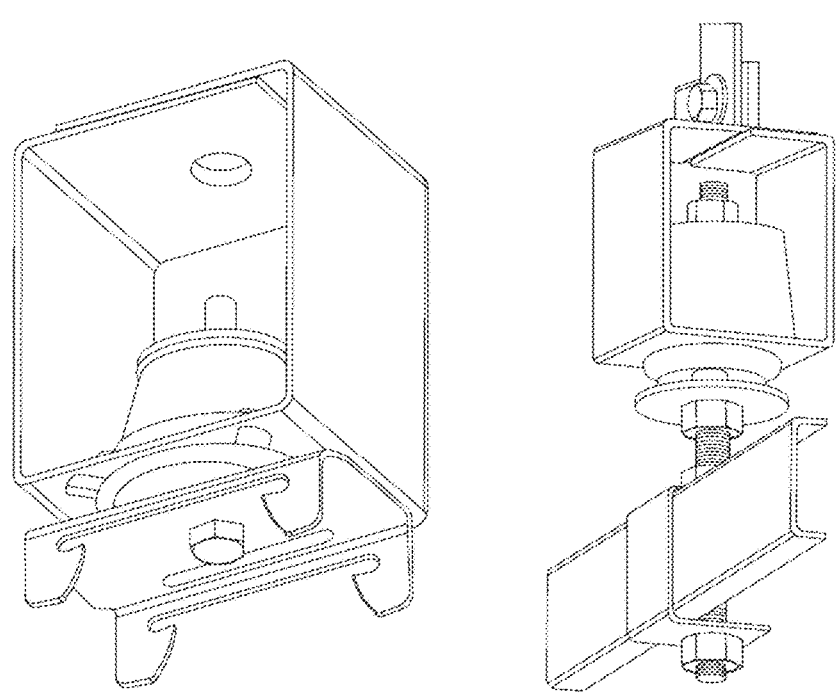
FIG. 8
Prior Art
FIG. 9
Prior Art
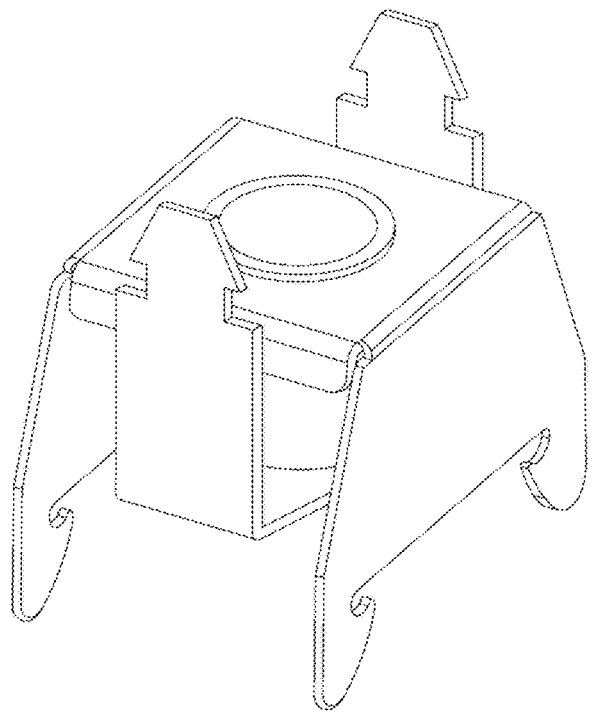
FIG. 10
Prior Art

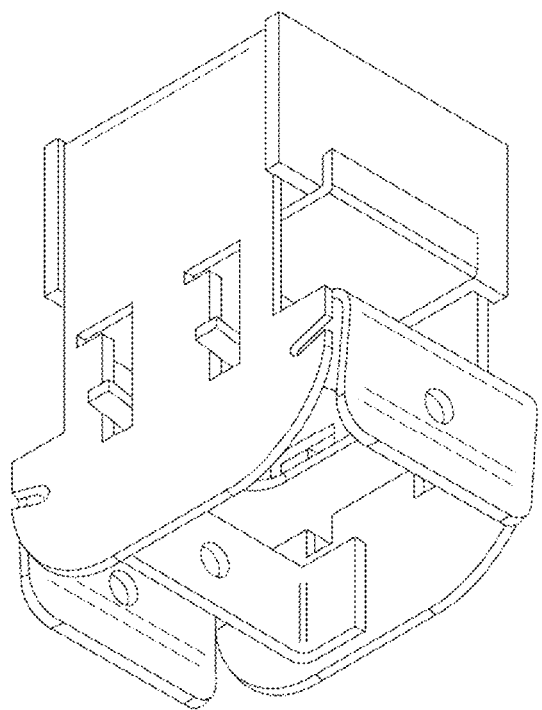
FIG. 11
Prior Art
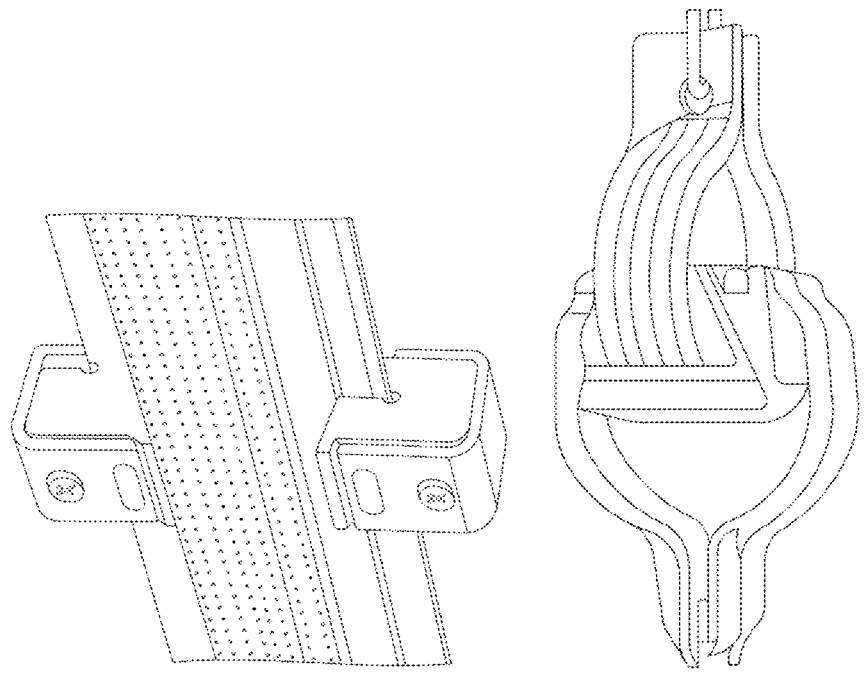
FIG. 12
Prior Art
FIG. 13
Prior Art

PERFORMANCE CHARACTERISTICS

Axial loads: Load deflection is close to linear from 10% to 100% load.

| Bracket | Load range Kg | Spring constant kg/mm | Static deflection mm |
|---|---|---|---|
| DWCH | 25-50 | 10 | 5 |

| Brand | Thickness | Type | Layers | Weight | | Total weight kg/m² | Range kg/m² | Avg. kg/m² |
|---|---|---|---|---|---|---|---|---|
| 10mm Plasterboard | | | | | | | | |
| CSR | 10mm | Soundchek | 2 | 9.5 | kg/m² | 19.0 | 16.8-19.0 | 18.05 |
| Boral | | Soundstop | 2 | 9.2 | kg/m² | 18.4 | | |
| Knauf | | Soundshield | 2 | 8.4 | kg/m² | 16.8 | | |
| Gtek (BGC) | | Soundboard | 2 | 9.0 | kg/m² | 18.0 | | |
| 13mm Plasterboard | | | | | | | | |
| CSR | 13mm | Soundchek | 2 | 13.0 | kg/m² | 26.0 | 24.0-26.0 | 24.95 |
| Boral | | Soundstop | 2 | 12.0 | kg/m² | 24.0 | | |
| Knauf | | Soundshield | 2 | 12.4 | kg/m² | 24.8 | | |
| Gtek (BGC) | | Soundboard | 2 | 12.5 | kg/m² | 25.0 | | |
| 16mm Plasterboard | | | | | | | | |
| CSR | 16mm | Fyrcheck | 2 | 12.55 | kg/m² | 25.1 | 24.6-26.0 | 25.3 |
| Boral | | Firestop | 2 | 13.0 | kg/m² | 26.0 | | |
| Knauf | | Fireshield | 2 | 12.3 | kg/m² | 24.6 | | |
| Gtek (BGC) | | Fireboard | 2 | 12.7 | kg/m² | 25.4 | | |

FIG. 26

| Layers | Plasterboard | Spacings (metres) | | | | Plaster kg/m² per layer | Plaster kg/m² total | Framing & insulation kg/m² | Mounts req'd per 100m² | Mounts per m² | Approx. load per mount kg |
|---|---|---|---|---|---|---|---|---|---|---|---|
| | | Fixings | Primary | Pri Type | Secondary | | | | | | |
| 1 | 10mm | 1.2 | 1.2 | M27 | 0.6 | 9.0 | 9.0 | 2.0 | 139 | 1.39 | 7.9 |
| 1 | 13mm | 1.2 | 1.2 | M27 | 0.6 | 12.5 | 12.5 | 2.0 | 139 | 1.39 | 10.4 |
| 2 | 10mm | 1.2 | 1.2 | M27 | 0.6 | 9.0 | 18.0 | 2.0 | 139 | 1.39 | 14.4 |
| 2 | 13mm | 1.2 | 0.9 | M27 | 0.6 | 12.5 | 25.0 | 2.5 | 185 | 1.85 | 14.9 |
| 2 | 16mm | 1.2 | 0.9 | M27 | 0.6 | 12.5 | 25.0 | 2.5 | 185 | 1.85 | 14.9 |
| 3 | 16mm | 0.9 | 0.9 | M27 | 0.6 | 12.5 | 37.5 | 2.5 | 185 | 1.85 | 21.6 |
| 2 | 16mm | 1.2 | 1.2 | M38 | 0.6 | 12.5 | 25.0 | 2.1 | 139 | 1.39 | 19.5 |
| 3 | 16mm | 1.2 | 1.2 | M38 | 0.6 | 12.5 | 37.5 | 2.1 | 139 | 1.39 | 28.5 |

FIG. 27

ACOUSTIC MOUNT

FIELD OF THE INVENTION

The present invention relates to acoustic mounts which can be used in applications where it is desirable to reduce transmission of acoustic vibrations from one area to another, particularly in building environments.

BACKGROUND OF THE INVENTION

Vibrations are transferred between different building structures, such as walls, floors, ceilings, and the like at abutting or connecting points. In the building industry, for example, external masonry walls are often clad internally with thinner plaster board walls which are secured at mounting or connecting points to the external wall. Noise travels from the masonry wall via these connecting points to the plaster board walls and vice versa. A similar situation occurs internally between adjacent areas or rooms, between ceilings and the structural floor above, and between flooring and the structure below where noise is transferred by connecting points between internal building components.

There are products used in the building industry to dampen transfer of vibrations at connecting points on walls, or between a floor and its support structure, or between a ceiling and a structure above, or between a structure and a cladding. These products which are herein called "resilient mounts" include a resilient sound dampening pad between one structure and a bracket or another connecting element that, in use, is mounted to an adjacent structure.

Numerous examples of commercially available resilient mounts are illustrated and described in some detail later in relation to FIGS. 1 to 13 of the drawings. They all display a substantially linear relationship between the load applied to the resilient dampening element and the resulting compression. This characteristic required suppliers of such resilient mounts to produce several different products with different specifications for use in different building construction applications, particularly where different loads will be applied in use, such as different types and weights of plasterboard. In addition, ineffective sound damping can occur where particular resilient mounts are used near or beyond their optimum specified range of loadings.

The above references to and descriptions of prior proposals or products are not intended to be, and are not to be construed as, statements or admissions of common general knowledge in the art in Australia or elsewhere.

OBJECTS OF THE INVENTION

It is an object of the present invention to provide an acoustic mount that can provide effective vibration damping across a range of loads.

It is a further and preferred object to provide an acoustic mount that can provide effective vibration damping at light loads.

Further preferred objects are to provide methods of building construction involving acoustic mounts installed to provide effective vibration damping across a range of loads and/or at light loads, and to provide building constructions having effective vibration damping. A further preferred object is to provide a vibration damper useable in the acoustic mount of the invention.

SUMMARY OF THE INVENTION

According to a first aspect of the invention there is provided an acoustic mount for damping vibrations between a primary structure of a building and a secondary structure of a building in which the primary and secondary structures are mounted or coupled in use to each other whilst being separated from each other in an axial direction, the acoustic mount including:

a vibration damper which is interposed in use between the primary and secondary structures so as to damp vibrations and thereby limit the transmission through the vibration damper of the vibrations in one of the structures to the other of the structures, the vibration damper being resiliently compressible in the axial direction;

wherein the vibration damper has at least one resiliently compressible damper element which is elongated in the axial direction so that the axial length of the damper element is greater than half of a transverse width thereof;

wherein the or each said at least one damper element reduces in cross sectional area in the axial direction;

wherein the or each said at least one damper element has a convex outer surface in planes containing the axial direction; and whereby the vibration damper possesses non-linear axial deflection or compression characteristics under a range of static loading conditions enabling effective vibration damping or vibration isolation for a substantial range of loadings of the acoustic mount in use.

Preferably the axial length of the or each said at least one damper element is greater than half of all transverse widths thereof. However it may be effective for some applications for some transverse sections to have a long dimension equal to or greater than the axial length.

Preferably the or each said at least one damper element has a convex outer surface in all planes containing the axial direction. However for some damper elements a straight linear shape in some (but not all) planes containing the axial direction may be provided.

Preferably the or each said at least one damper element has a continuous convexity of its outer surface extending to a tip which in use engages with the primary or secondary structure or with a building element which is connected to the primary or secondary structure. However some discontinuity in the convexity may be provided for some damper elements or for some sections containing the axial direction. The continuous convex outer surface in a plane containing the axial direction may have a curved shape defined by a quadratic equation, including segments of ellipses, parabolas, hyperbolas. The convex outer surface may be a quadric surface with the curved shape of the convex surface in multiple planes containing the axial direction being defined by quadratic functions. A surface whose equation is a quadratic in the variables x, y and z (or Cartesian orthogonal planes) is called a quadric surface. In preferred embodiments the shape of the or each vibration damper element is selected from ellipsoids, ellipsoids of revolution, elliptic paraboloids, paraboloids of revolution, elliptic hyperboloids, hyperboloids of revolution.

In another possible embodiment in which the or each said at least one damper element has a continuous convexity of its outer surface extending to a tip which in use engages with the primary or secondary structure or with a building element which is connected to the primary or secondary structure, the continuous convex outer surface in a plane containing the axial direction may have a curved shape substantially defined by the exponential function: $y=e^{kx}$, where e satisfies $\ln e = 1$, k is a constant. In this embodiment, preferably k=0.3 recurring so that the continuous convex outer surface in a plane containing the axial direction has a curved shape substantially defined by the exponential function:

$$y = e^{\frac{x}{3}}$$

Preferably the or each damper element is located atop a damper column which extends in and is resiliently compressible in the axial direction. A preferred vibration damper has multiple columns connected together with a damper element atop each of the columns projecting above regions where the columns are connected together.

In one embodiment the vibration damper includes a main body composed of resiliently compressible material and the or each damper element projects in the axial direction from the main body. There may be multiple damper elements arranged in an array projecting from the main body as to engage in use with one of the primary and secondary structures or with one or more building elements attached to one of the primary and secondary structures. The multiple damper elements may include some having different axial lengths so that in use when there is no or little compressive load in the axial direction not all of the damper elements engage with the associated structure or building element, and so that when increased compressive load is applied a greater number of damper elements engage with the structure or building element as the axially longer damper elements compress.

In another possible embodiment the body has projecting from a side opposite to the damper elements multiple supplementary damper elements to engage with one of the primary and secondary structures or with building elements attached to one of the primary and secondary structures. In this embodiment the supplementary damper elements may have different shapes to the primary damper elements including shapes selected from cylindrical, (including cylinders having triangular cross-section, square cross-section, rectangular cross-section, other polygonal cross-section, circular cross-section, elliptic cross-section), truncated conical, frustroconical, hemispherical, and truncated hemispherical.

In a second aspect the invention provides an acoustic mount according to the first aspect and further including a support member to which the vibration damper is attached so that the support member extends laterally from the vibration damper relative to the axial direction, the support member in use being connected to one of the primary and secondary structures and being separated from the other of the structures in the axial direction by at least one said damper element of the acoustic mount.

In a third aspect the invention provides a method of damping sound vibrations in a building travelling between a first structure of the building and a second structure of the building wherein the first and second structures are connected at a connecting point, the method including providing an acoustic mount according to the first or second aspect locating the acoustic mount at the connecting point and fixing with a first fixing element the acoustic mount to the primary structure, fixing with a second fixing element the acoustic mount to the secondary structure so that the or each resiliently compressible damper element is interposed between the primary and secondary structures and the respective first and second fixing elements so that vibrations in one of the structures is damped or isolated or at most is transmitted with substantial attenuation.

In a fourth aspect the invention provides a building structure having means for damping sound vibrations travelling from the first structure of the building to a second structure of the building wherein said first and second structures are connected at connection points, said building structure having at each of the connecting points an acoustic mount installed according to the method of the third aspect.

In a fifth aspect there is provided a vibration damper useable in the acoustic mount of the first or second aspect, the vibration damper being interposed in use between the primary and secondary structures so as to damp vibrations and thereby limit the transmission through the vibration damper of the vibrations in one of the structures to the other of the structures, the vibration damper being resiliently compressible in the axial direction;
  wherein the vibration damper has at least one resiliently compressible damper element which is elongated in the axial direction so that the axial length of the damper element is greater than a transverse width thereof;
  wherein the or each said at least one damper element reduces in cross sectional area in the axial direction;
  wherein the or each said at least one damper element has a convex outer surface in planes containing the axial direction; and
  whereby the vibration damper possesses non-linear axial deflection or compression characteristics under a range of static loading conditions enabling effective vibration damping or vibration isolation for a substantial range of loadings of the acoustic mount in use.

BRIEF DESCRIPTION OF THE DRAWINGS

Descriptions of acoustic mounts for buildings, their features and operation, and their properties will now follow. Possible and preferred features of the present invention will also be described with particular reference to the accompanying drawings. However it is to be understood that the features of the invention illustrated in and described with reference to the relevant drawings are not to be construed as limiting on the scope of the invention. In the drawings:

FIGS. 1 to 13 depict commercially available resilient mounts for use in building construction.

FIG. 25a is an underneath perspective view of a possible resilient mount according to the invention.

FIG. 25b is a side view of the resilient mount of FIG. 25a.

FIG. 25c is an exploded top perspective view of the mount of FIG. 25a.

FIG. 25d is an image of the mount of FIGS. 25a-25c assembled with a support member for a furring channel and associated connecting elements.

FIG. 26 tabulates properties of plasterboard products.

FIG. 27 tabulates loadings of acoustic mounts used with plasterboard products.

DESCRIPTION OF THE INVENTION

Figure 5:
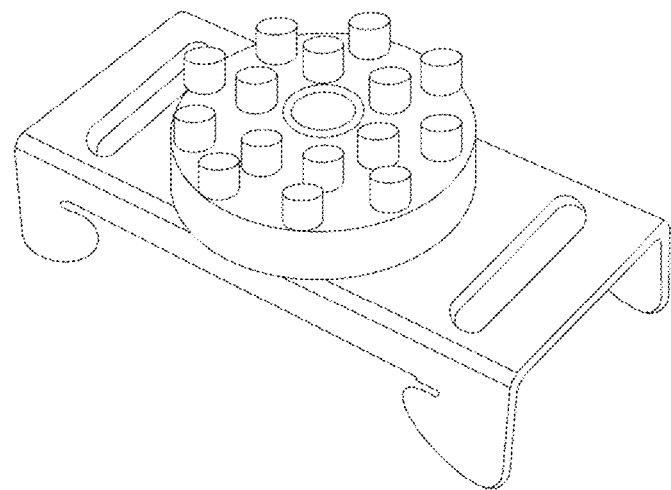
Figure 6:
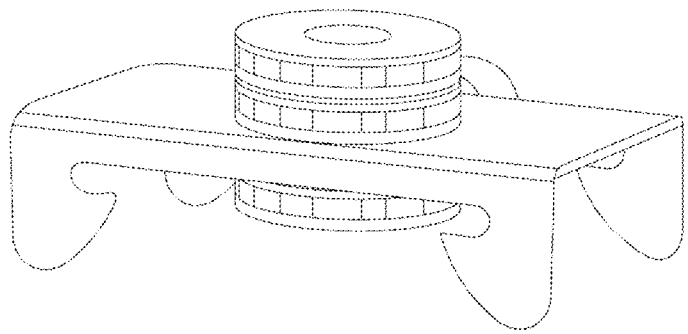
Figure 7:
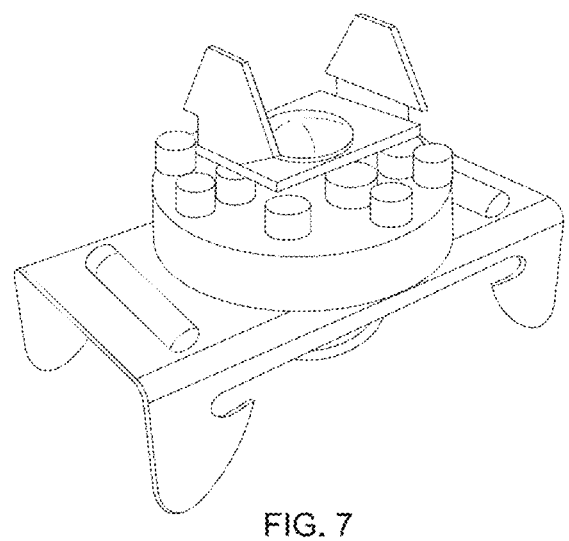

Known commercially available resilient mounts employ a resilient damping element that falls into one of four categories:

Basic cylindrical design—see examples in FIGS. 1 to 4.
Multiple columnar design—see examples in FIGS. 5 to 7.
Truncated conical design—see examples in FIGS. 8 to 10.
Cubical design—see examples in FIGS. 11 to 13.

The acoustical performance properties of all four designs—basic cylindrical, multiple columnar, truncated conical and cubical—can be described or depicted in a linear fashion, or near-linear fashion, whereby the relationship between the load applied to the resilient damping element and the compression of that element substantially is linear, ie. y is equal to a constant times x, or y=kx.

Figure 1:
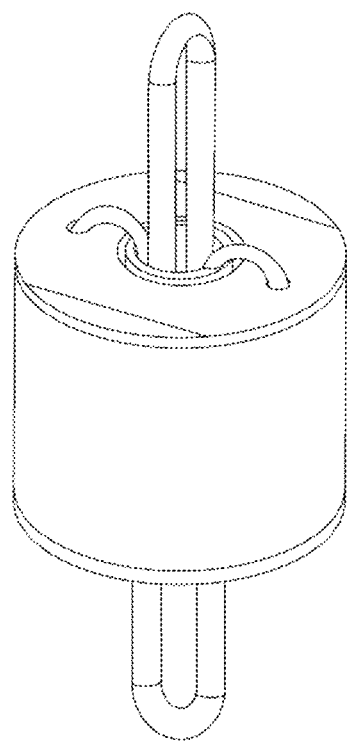
Figure 2:
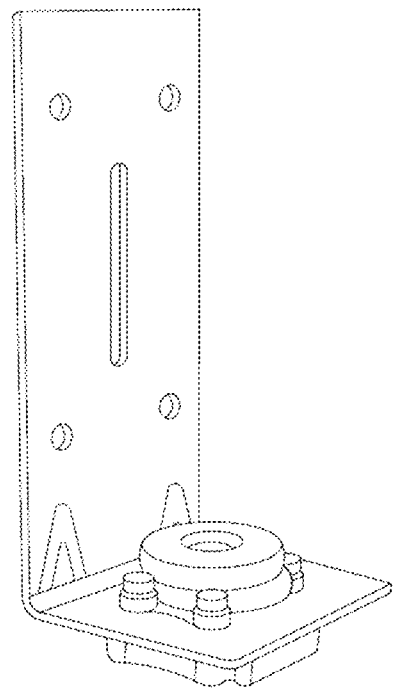
Figure 3:
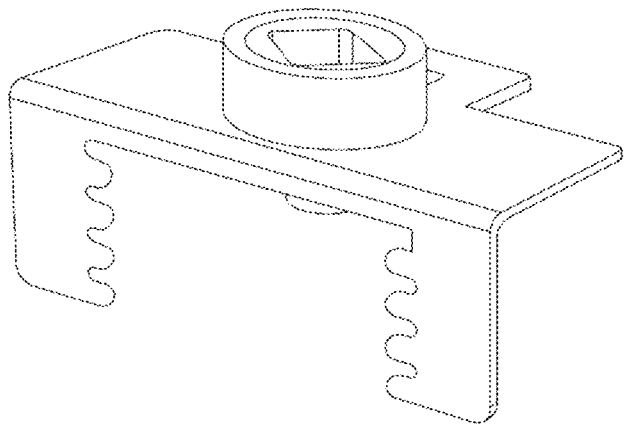
Figure 4:
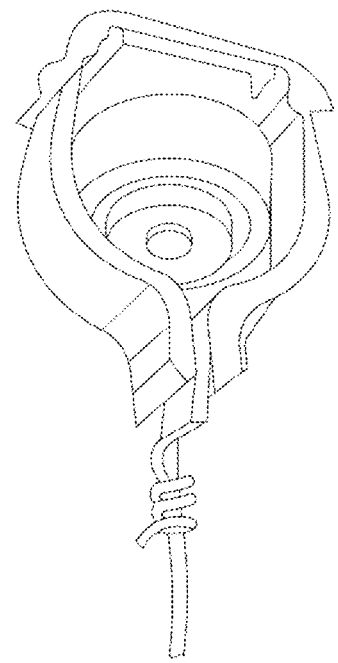
Figures 14, 15:
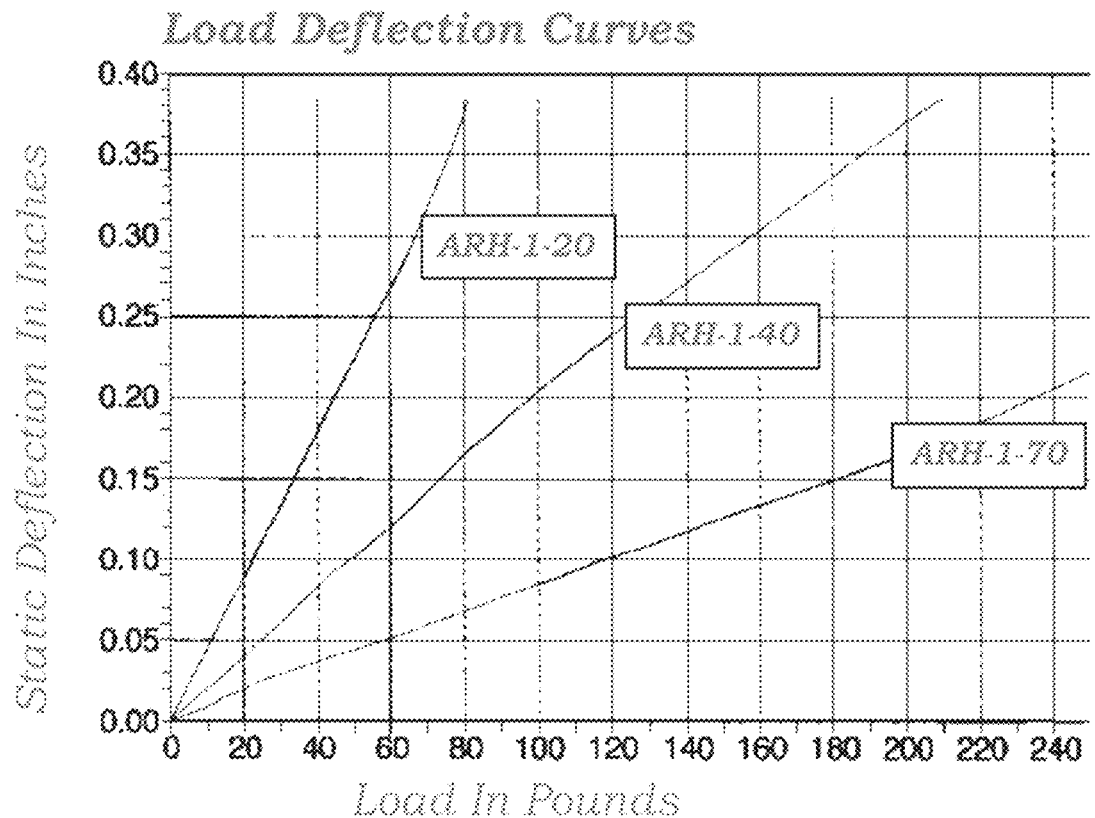
FIGS. 14 and 15 illustrate performance data for two of the commercial products.

Evidence of this linear relationship is documented in the load deflection table published by LD Peters & Sons Inc for the ARH-1 product (see FIG. 14) which employs a basic cylindrical design similar to that shown in FIG. 1. It is also documented in the Embelton DWCH product datasheet (see product shown in FIG. 1) that states "load deflection is close to linear" and notes performance as "spring constant" with an example of 10 kg per mm of deflection (see FIG. 15).

Figure 16:
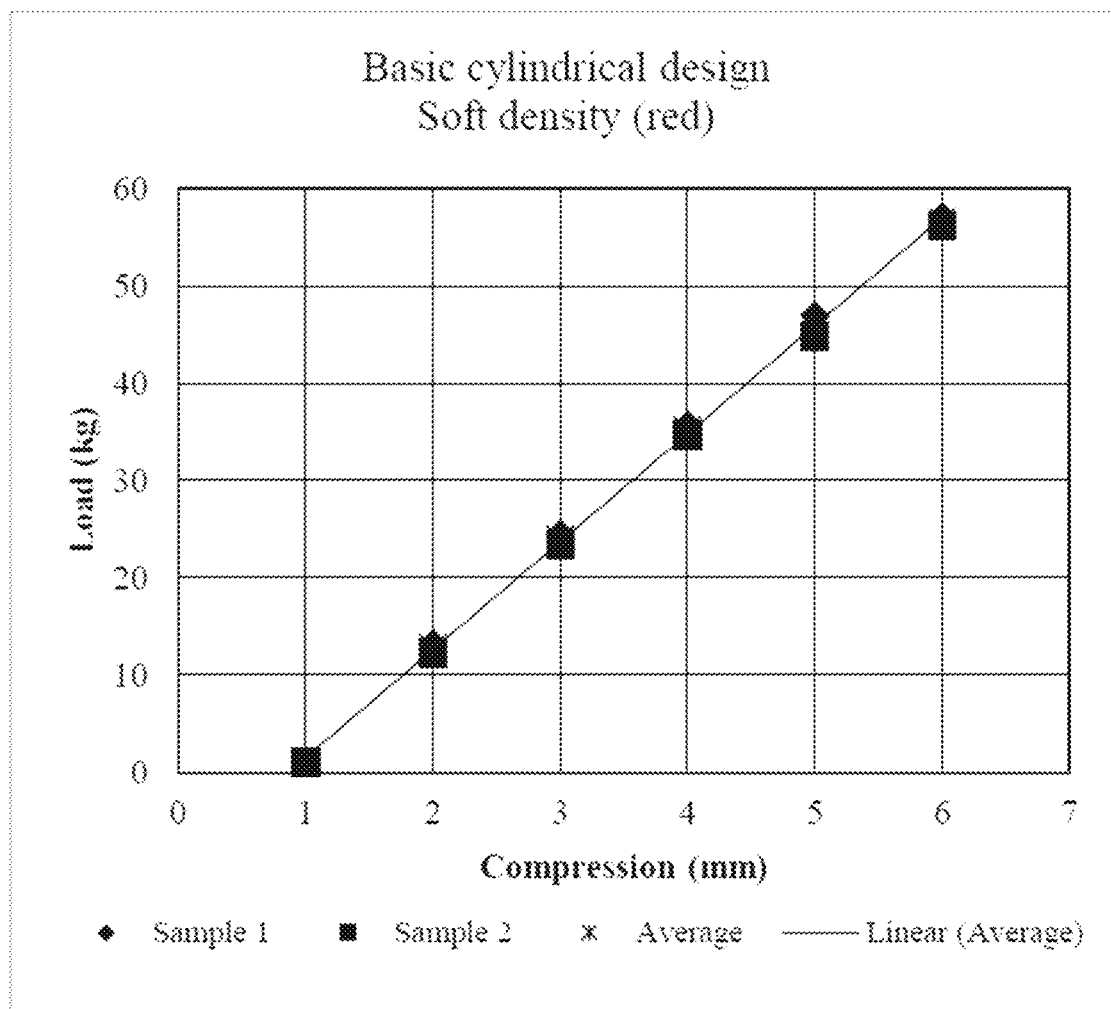
FIGS. 16 to 22 illustrate performance data from tests of commercial products carried out for the applicant.
Figure 17:
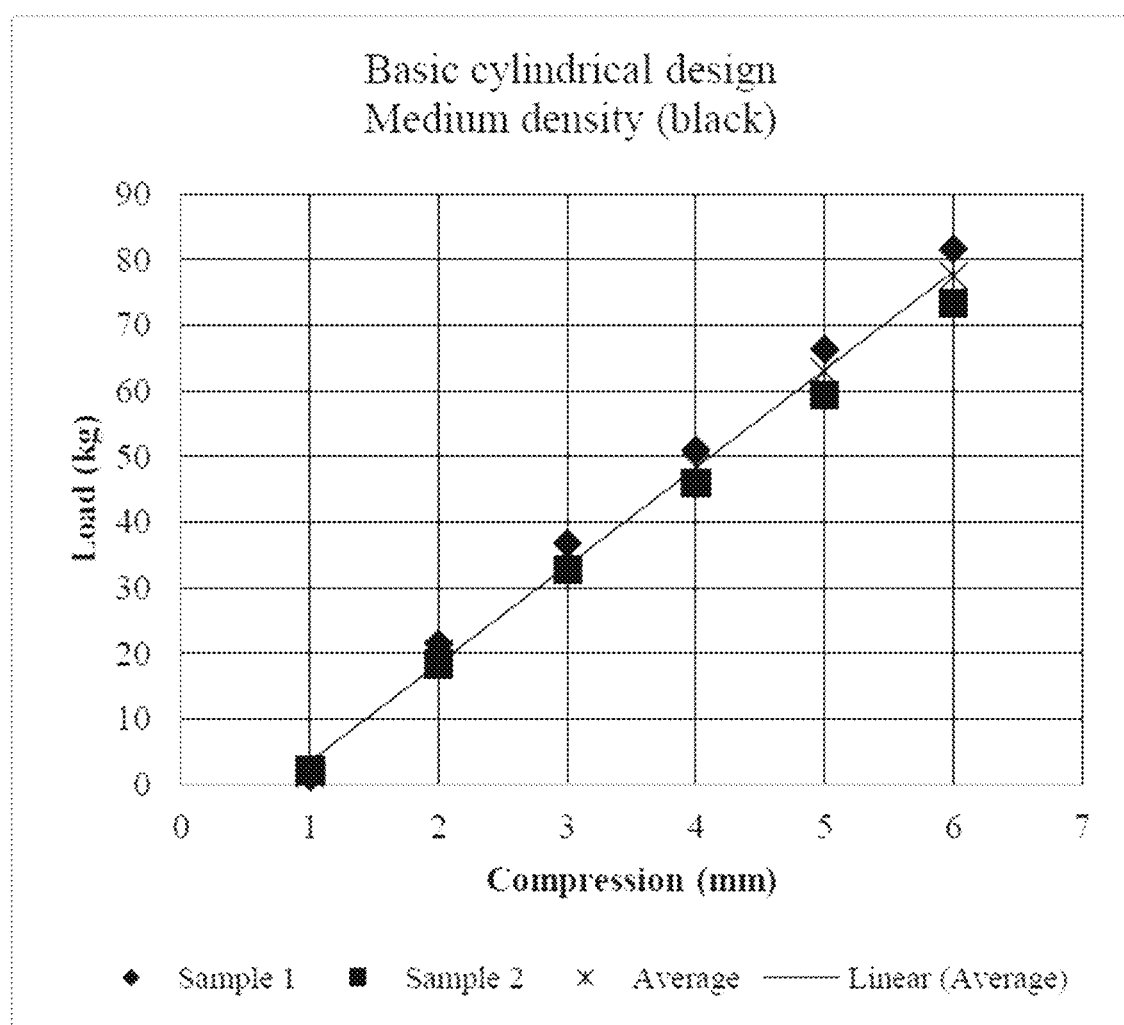
Figure 18:
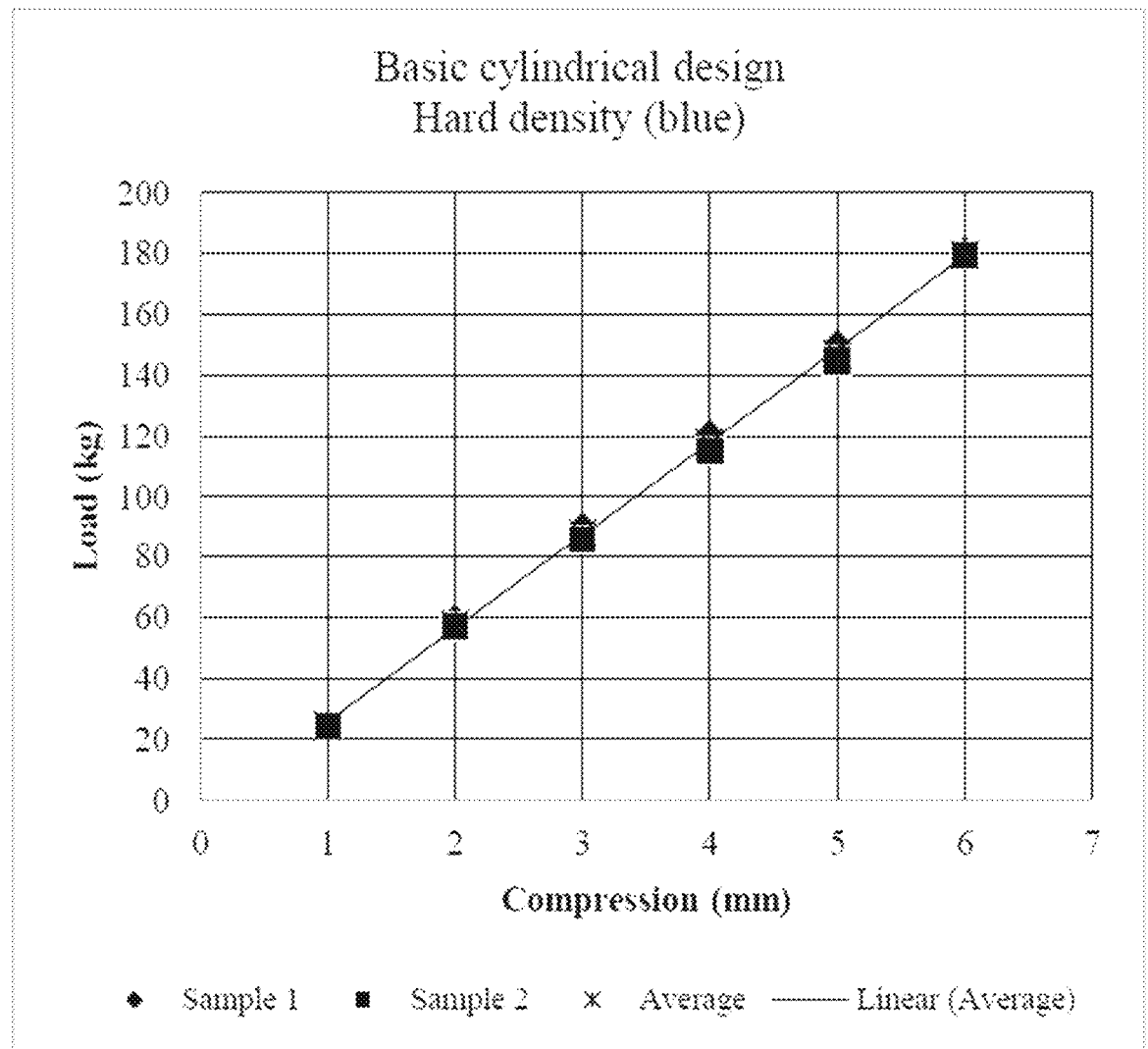
Figure 19:
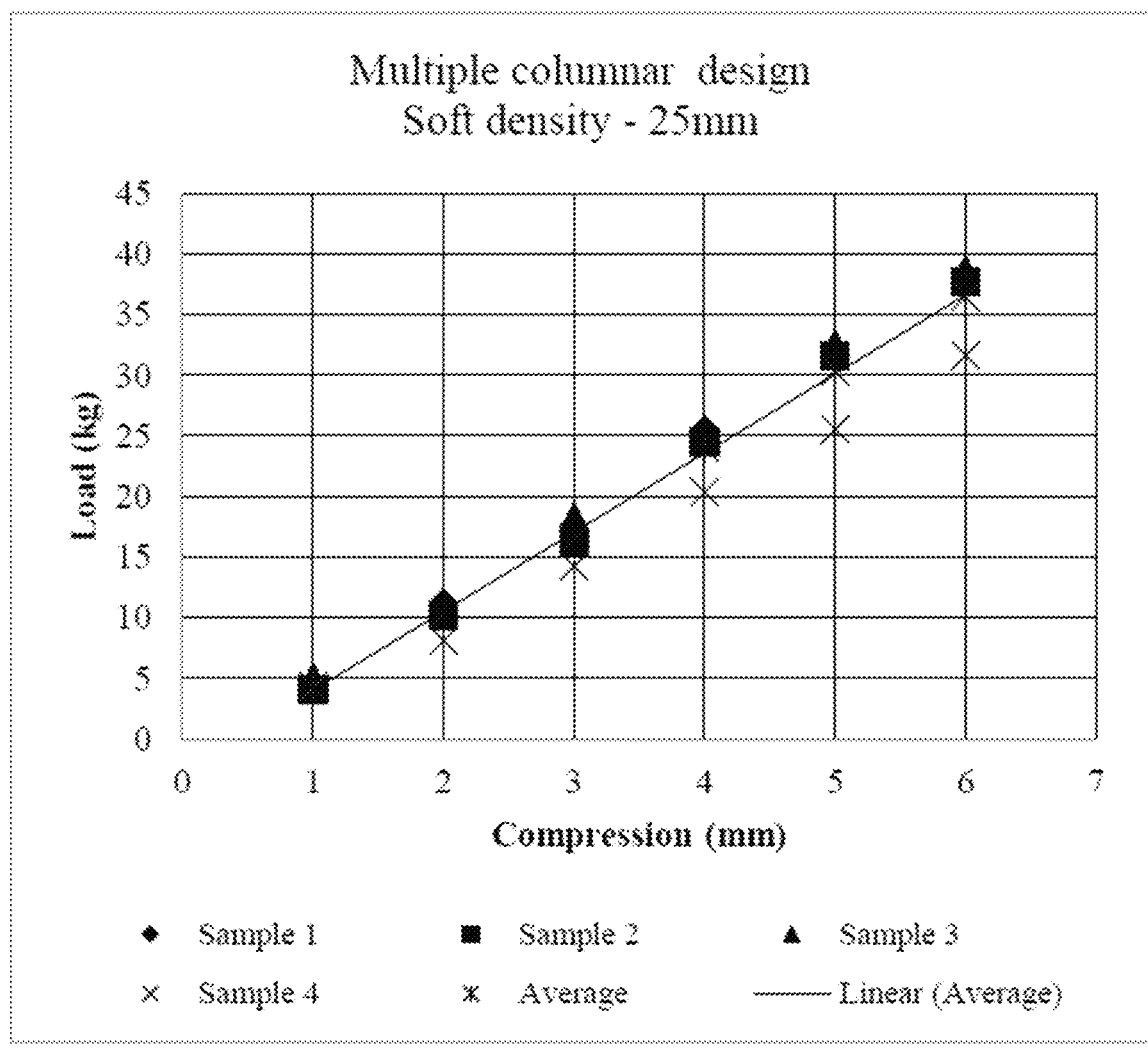
Figure 20:
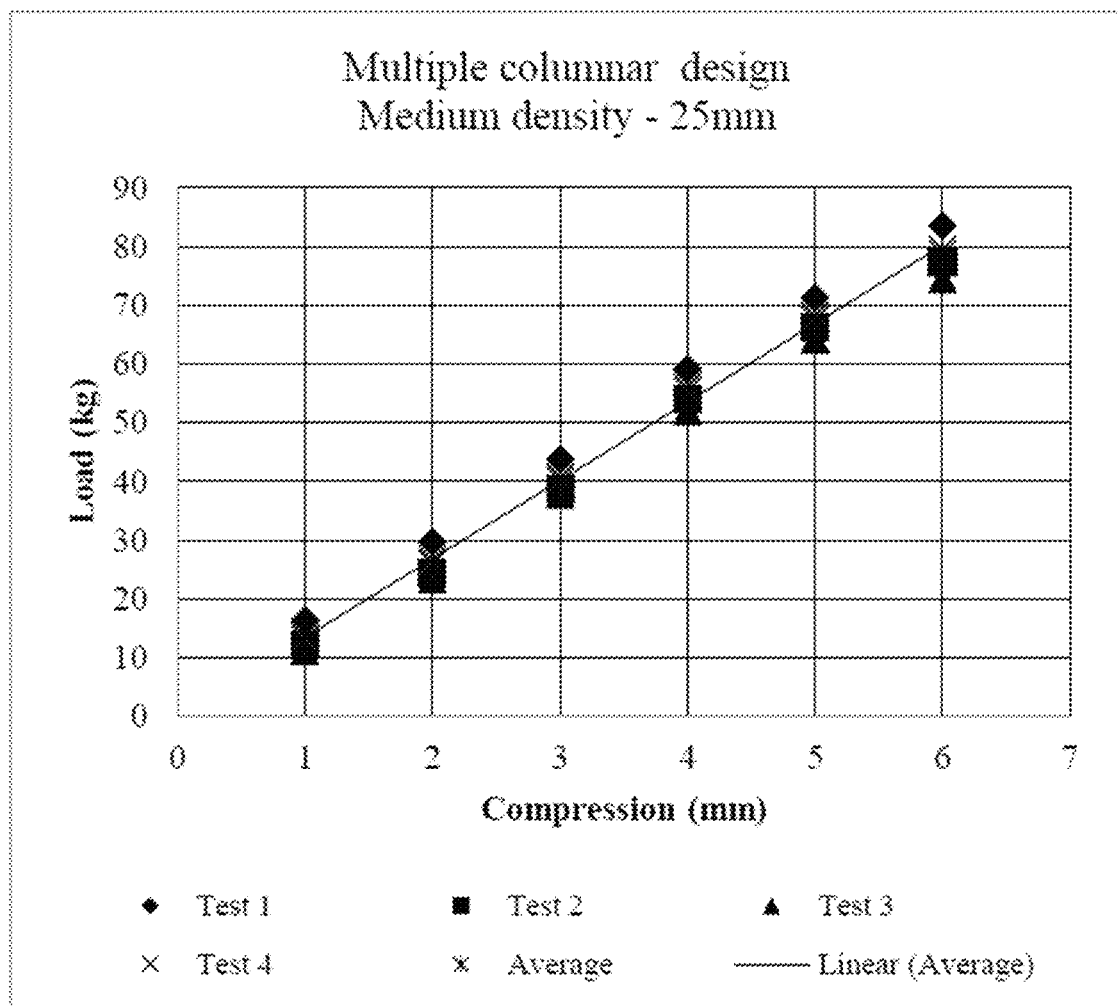
Figure 21:
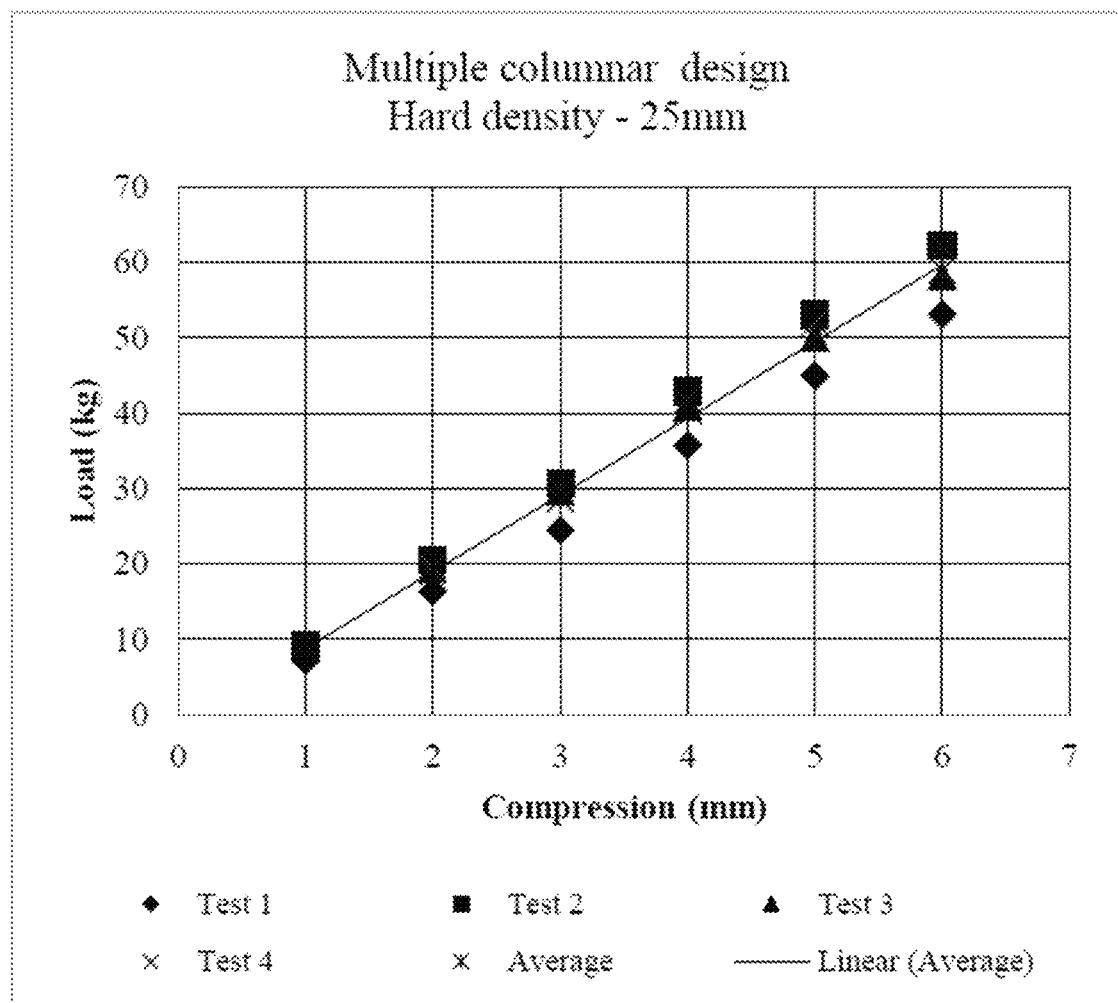

This linear relationship theory was tested and proven in a study commissioned by the present applicant whereby several samples of both basic cylindrical elements (see FIGS. 16-18) and multiple columnar elements (see FIGS. 19-21) tested were tested and the mean average of each sample set was found to be within 2% of a straight line.

This linear relationship was found to hold true for both natural rubber (FIGS. 16-18) and synthetic materials such as Santoprene (FIGS. 19-21) albeit at different slopes depending on the material type and molecular density.

Figure 22:
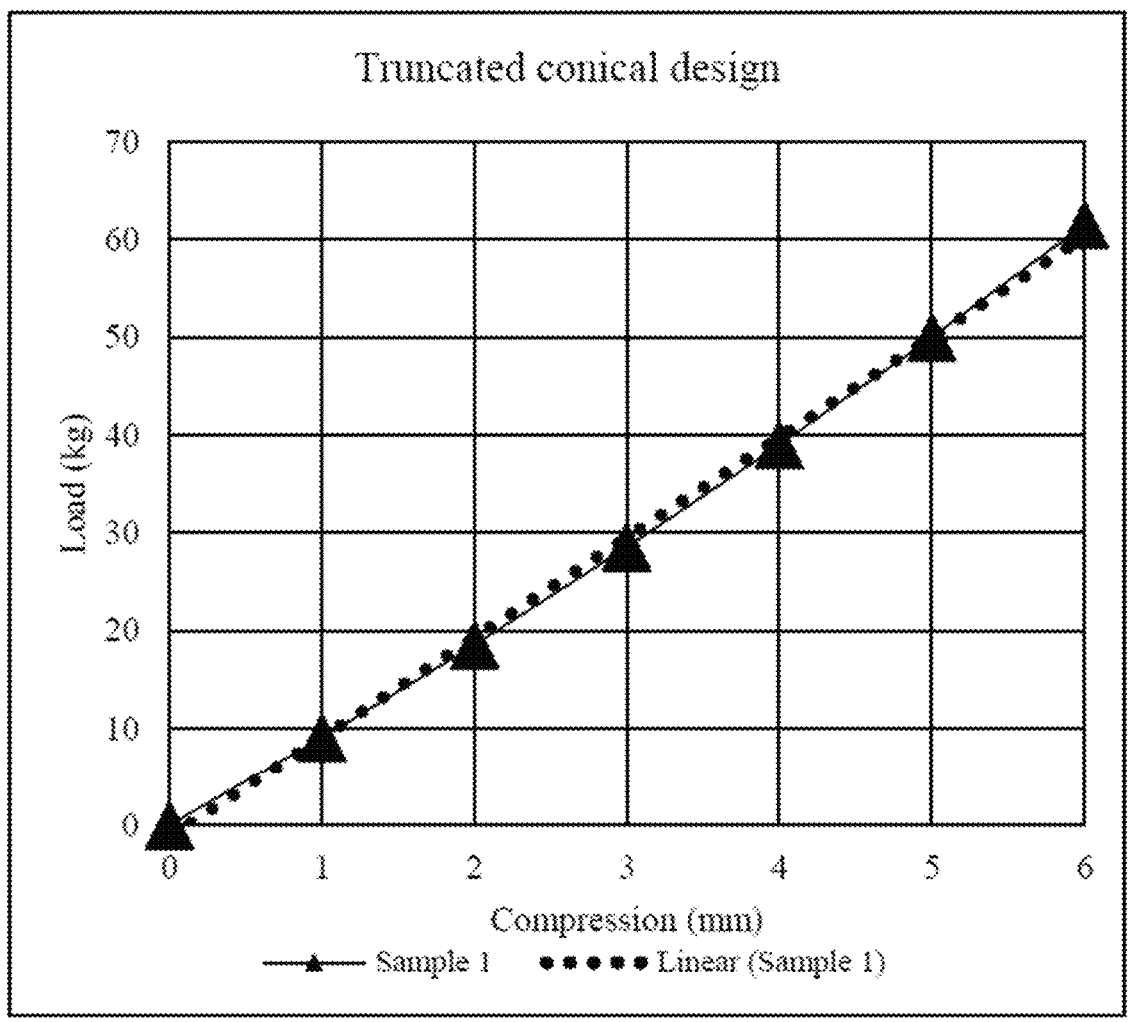

Resilient damping elements of a truncated conical design exhibit a near-linear performance curve due to interface surface increasing in size as the load is applied across the ever-widening height of the resilient element. A simulation of a resilient element similar to that shown in FIG. 8 displays a very slightly curved line that is within 5% of linear (see FIG. 22).

Although the truncated conical design displays some properties of parabolic curve, the distinction is too subtle across the load range to impact on the sensitiveness of the element at smaller load levels and therefore most product suppliers specify a minimum effective load mass for each product.

Supplier data for cubical design elements (e.g. FIGS. 11 to 13) is not readily available but it is safe to assume that it would perform in a manner similar to basic cylindrical design elements where the surface area of the element is constant across the element height and therefore compresses in a linear fashion as increasing loads are applied.

According to the present invention in one possible embodiment resilient elements of a circular paraboloid design are provided by the resilient mount so as to provide greater versatility across the industry average load range and higher sensitivity to lighter loads where current resilient mounts do not function well.

Figure 23:
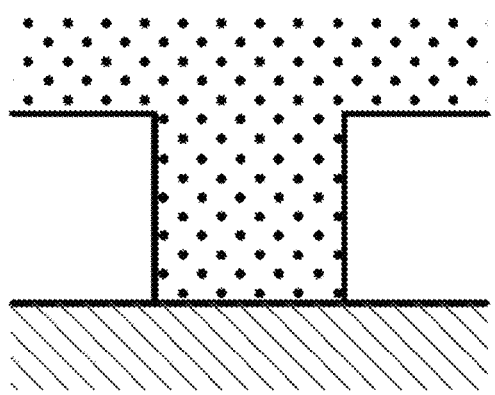
FIGS. 23 and 24 respectively schematically illustrate for comparison a resilient damper element of known configuration and one according to the invention.
Figure 24:
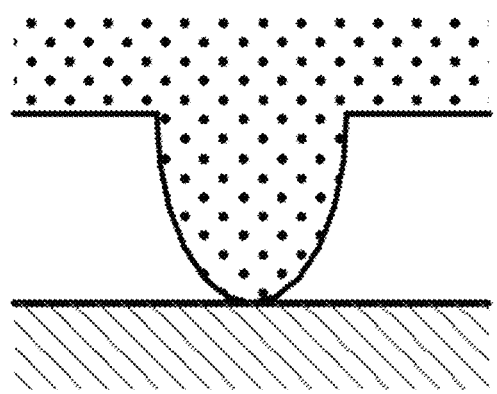

Circular paraboloid designs differ from the designs currently available on the market because the interface between the resilient damping element and the applied load is not a flat surface as presented by current designs (FIG. 23) but rather a surface at a tip of a convex element (FIG. 24).

Figures 25A, 25B:
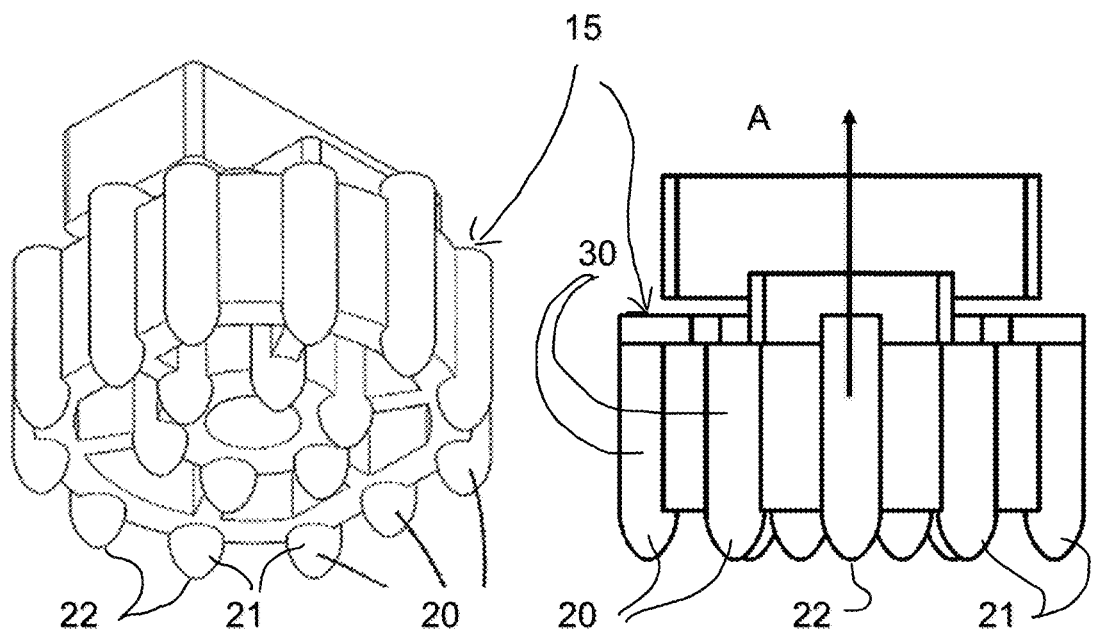
Figures 25C, 25D:
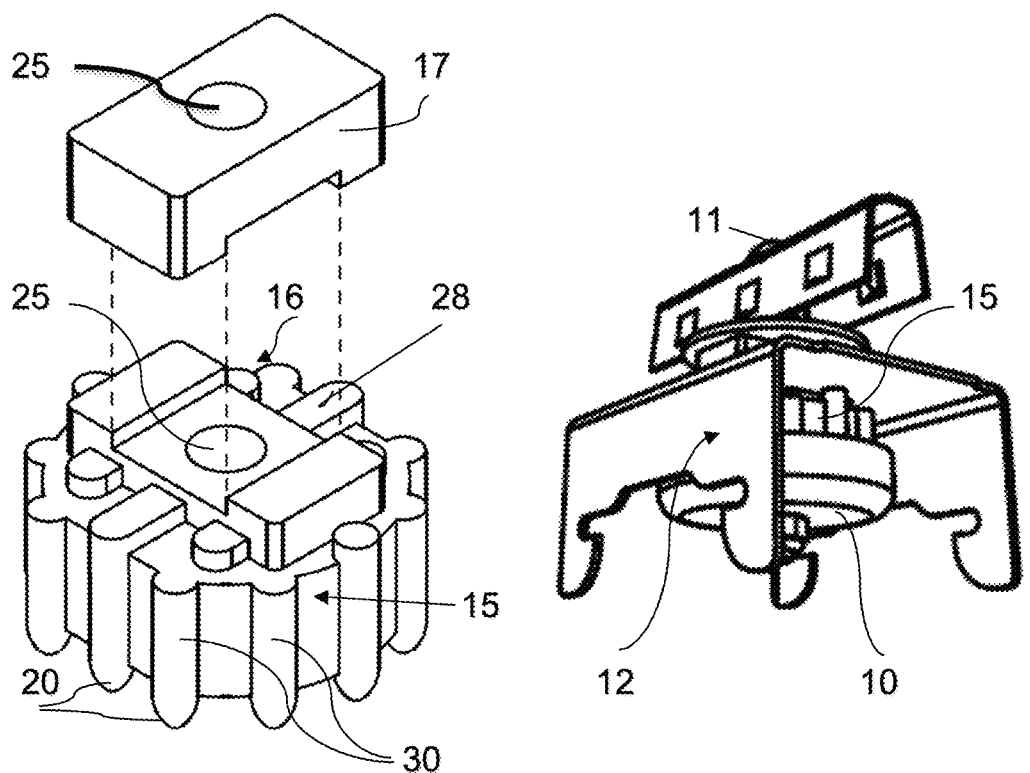

A resilient vibration damper of one embodiment of the invention employs a circular paraboloid design for multiple damper elements in conjunction with a multiple columnar design is shown in FIGS. 25*a*-25*c*. An acoustic mount using a damper of FIGS. 25*a*-25*c* is shown in FIG. 25*d*, and is used for damping vibrations between a primary structure of a building and a secondary structure of a building in which the primary and secondary structures are mounted or coupled in use to each other whilst being separated from each other in an axial direction. The acoustic mount of FIG. 25*d* includes the vibration damper which is interposed in use between the primary and secondary structures so as to damp vibrations and thereby limit the transmission through the vibration damper of the vibrations in one of the structures to the other of the structures. The vibration damper is resiliently compressible in the axial direction. The vibration damper has multiple resiliently compressible damper elements each of which is elongated in the axial direction so that the axial length of the damper element is greater than half of a transverse width thereof. In the illustrated circular paraboloid (or paraboloid of revolution) shape of damper element this means that the axial dimension exceeds the radius of a circular transverse cross section. Each damper element reduces in cross sectional area in the axial direction and each damper element has a convex outer surface in planes containing the axial direction. With this construction, the vibration damper possesses non-linear axial deflection or compression characteristics under a range of static loading conditions enabling effective vibration damping or vibration isolation for a substantial range of loadings of the acoustic mount in use.

To compare the performance of damper elements of circular paraboloid design with (a) basic cylindrical design and (b) truncated conical design, we first need to establish benchmark curves at optimum load mass for these two pre-existing designs.

For benchmarking, we will assume a design criteria constant of at least 3 mm of compression at 13.5 kg static load, given that the Australian National Construction Code references a minimum of 3 mm static deflection (compression) for resilient mounts in ceilings (see Australian Building Codes Board, 2011 *National Construction Code Volume 1*, Section F5.2, Table 3, p. 362) and experienced acoustic engineers generally state 'at least' 3 mm of compression.

To establish the specified load of 13.5 kg, FIG. 26 tabulates weights for the commercial plasterboard range.

From FIG. 26, one can see that there are two distinct weights per square metre: 18 and 25. To understand how this weight will be distributed by the supporting framework of the ceiling system, see FIG. 27 which tabulates mounting densities and resulting loadings per mount.

From FIG. 27 we can conclude that a weight per resilient mount of 13.5 kg would cover all three standard plasterboard thicknesses based on the slightly different framing arrangements noted in FIG. 27.

Therefore, we can assume a design criteria constant across all examples of 3 mm of compression at 13.5 kg static load per mount. We will also assume a constant element (node) height of 4 mm across all examples.

Figure 28:
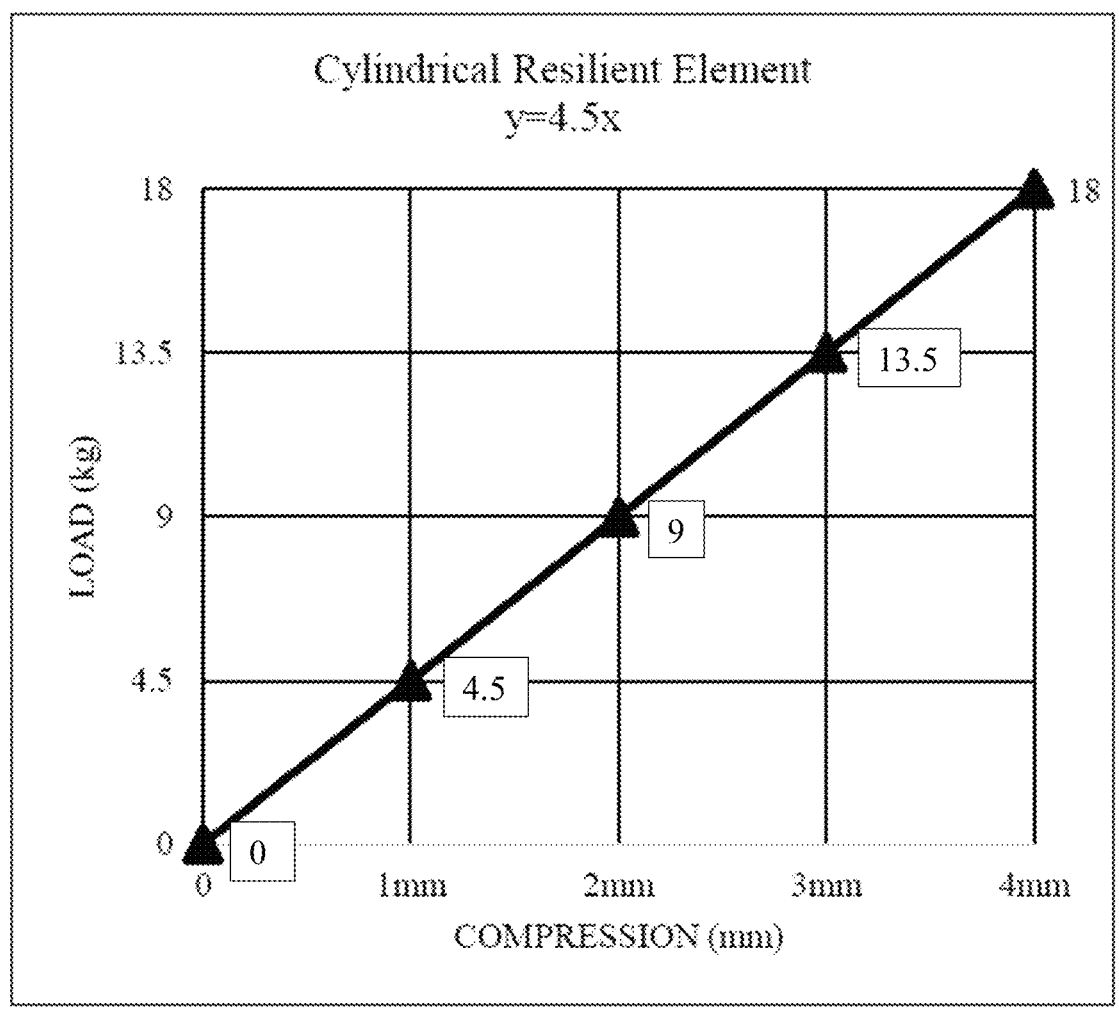
FIGS. 28 and 29 are plots relating compression of known resilient mount types for different loadings of plasterboard.

Firstly, we will examine a cylindrical design (assume basic cylindrical design and multiple columnar design perform in a similar manner) where the performance of the element offers 3 mm of compression at 13.5 kg static load per mount. If we assume that at 0 kg load, the compression equals zero, then the material performance can be expressed by the linear function:

$$y=4.5x$$

and the plot for this linear function would appear as depicted in FIG. 28.

From this simple linear plot, we can ascertain that a 9 kg load would compress the element 2 mm and likewise an 18 kg load would compress the element 4 mm, or 'all the way' as the element is only 4 mm long.

Secondly we will examine a truncated conical design where the performance of the element offers 3 mm of compression at 13.5 kg static load per mount. We will again assume that at 0 kg load, the compression equals zero and we will borrow similar material performance as the element depicted in FIG. 22 where:

$$\emptyset+5\% \text{ per mm}$$

The quadratic function for this curve can be expressed as:

$$y=0.1x^2+4.2x$$

Figure 29:
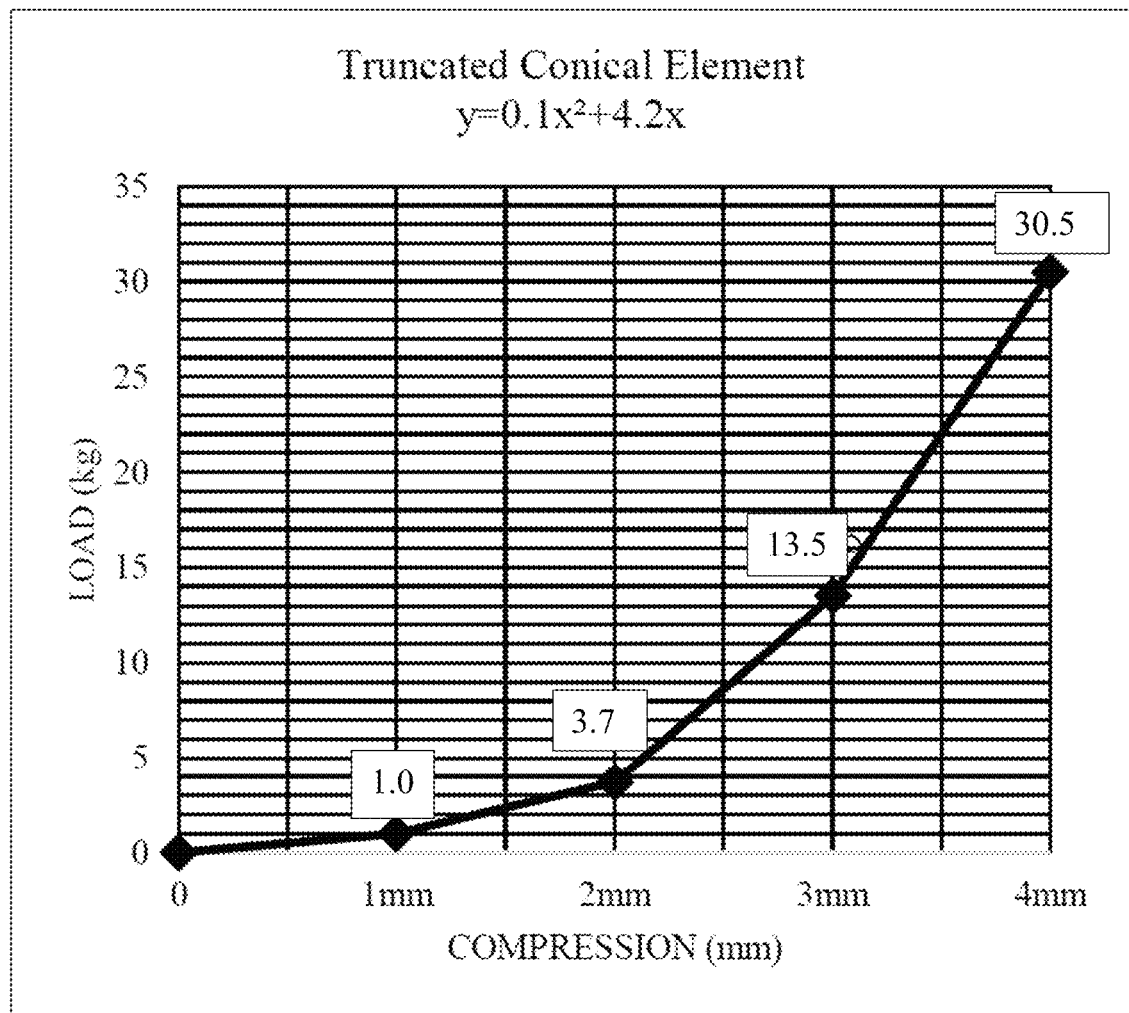

The shallow parabolic curve for this element would appear as depicted in FIG. 29.

From FIG. 29 we can ascertain that the curve is within 4% of a linear plot and the maximum load is only 2% greater than that of the cylindrical resilient element detailed in FIG. 28. For vibration damping effectiveness therefore, there is no significant difference in function between the cylindrical design and the truncated conical design.

Finally, we will examine a circular paraboloid design where the performance of the element again provides 3 mm of axial compression at 13.5 kg static load per mount but where the compression between 2.5 mmm and 4 mm is maximised for a larger effective range. We can use a simple formula to express this:

$$y=x^2$$

Figure 30A:
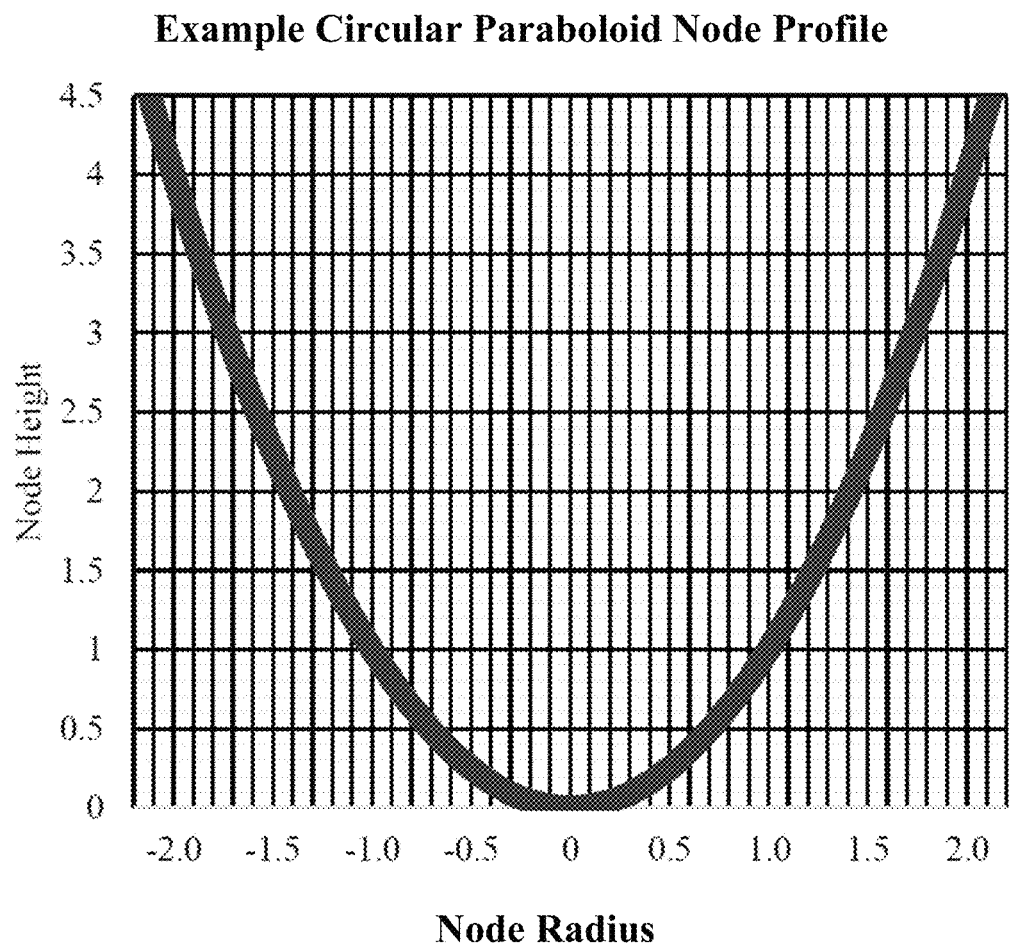
FIGS. 30a and 30b illustrate two possible shapes of damper element of a resilient mount according to the invention.

Based on this equation we can illustrate (in a cross section in a plane containing the axial direction) the exponential relationship between the width and the height of a node in a circular paraboloid design as FIG. 30a depicts.

An alternative design of the element that can provide similar performance over a similar effective range of compressions can be generated by the formula:

$$y = e^{\frac{x}{3}}$$

Figure 30B:
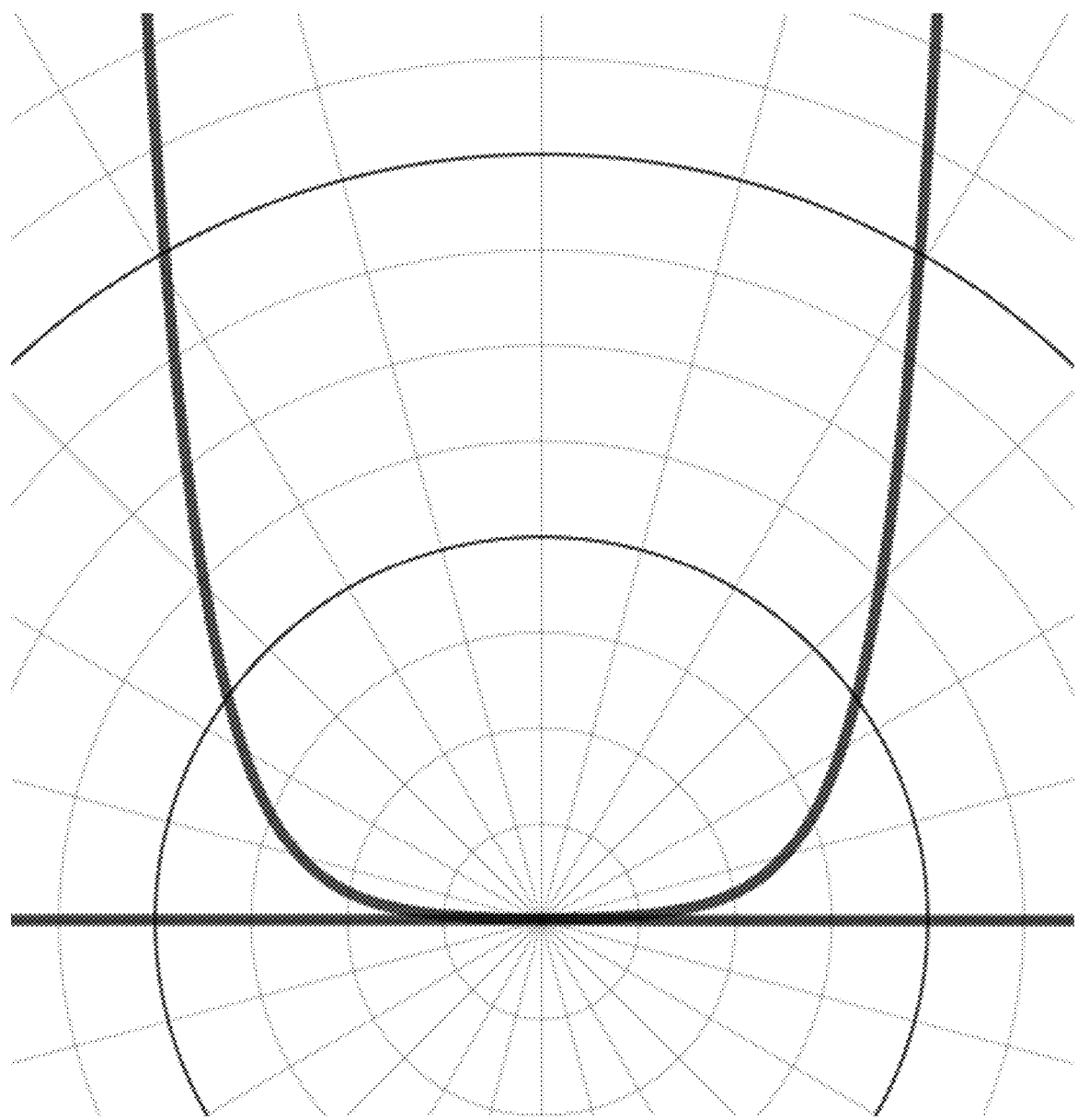

This exponential function can produce in cross section in a plane containing the axial direction an element having a design as shown in FIG. 30b.

Note that at this stage, there is no consideration of the density of the element material nor the durometer grade.

Figure 31:
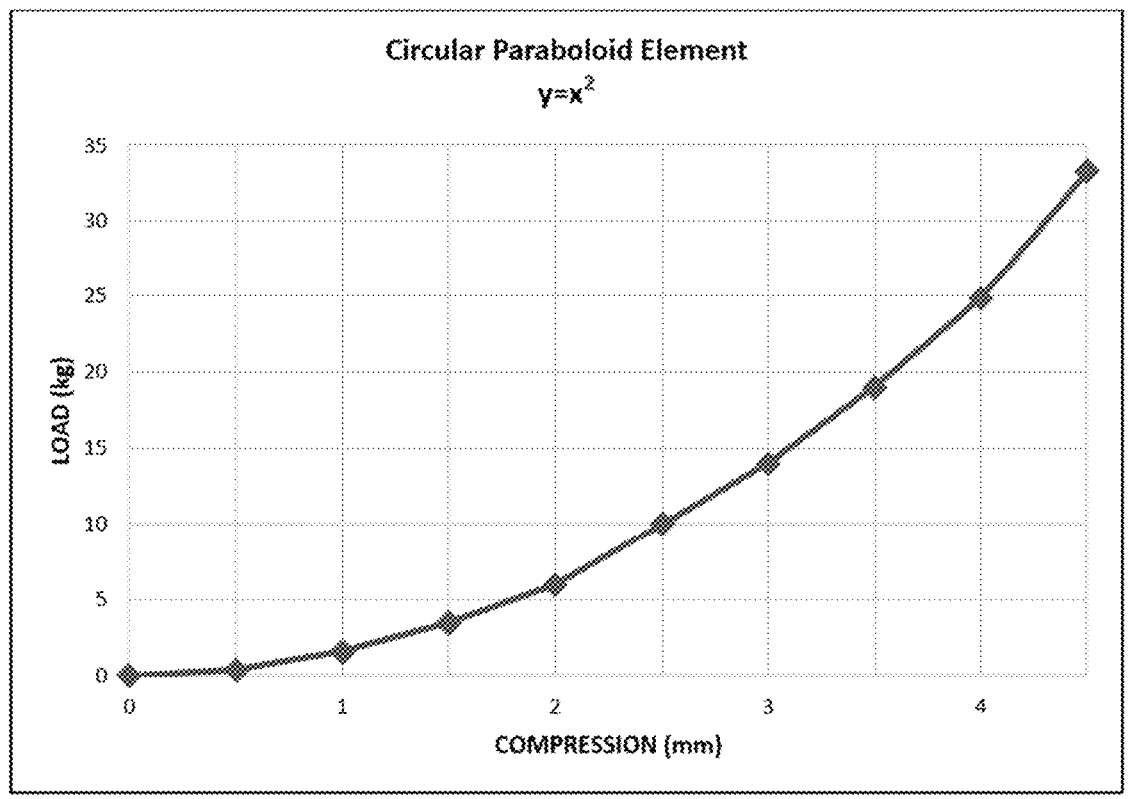
FIG. 31 is a plot relating compression of the element of FIG. 30 for different loadings.

Given that relationship we will assume that relationship between the compression of the node and the mass of the load applied is equal to the cross-sectional area of the flattened node interface. This generates a graphical relationship between load applied in the same direction and resulting compression as shown in FIG. 31.

From this graph it can be seen that the whilst we have not compromised the element's capability to achieve 3 mm compression at 13.5 kg, many other parameters have significantly changed:

Maximum load at 4 mm compression has increased 66% to 30.5 kg;
The element requires 31.5% less load (only 7.7 kg) to achieve minimum 2.5 mm compression;
Based on minimum 2.5 mm compression, the effective vibration damping range (2.5-4.0 mm) has increased from 11.25-18 kg to 8.7-30.5 kg.

Figure 32:
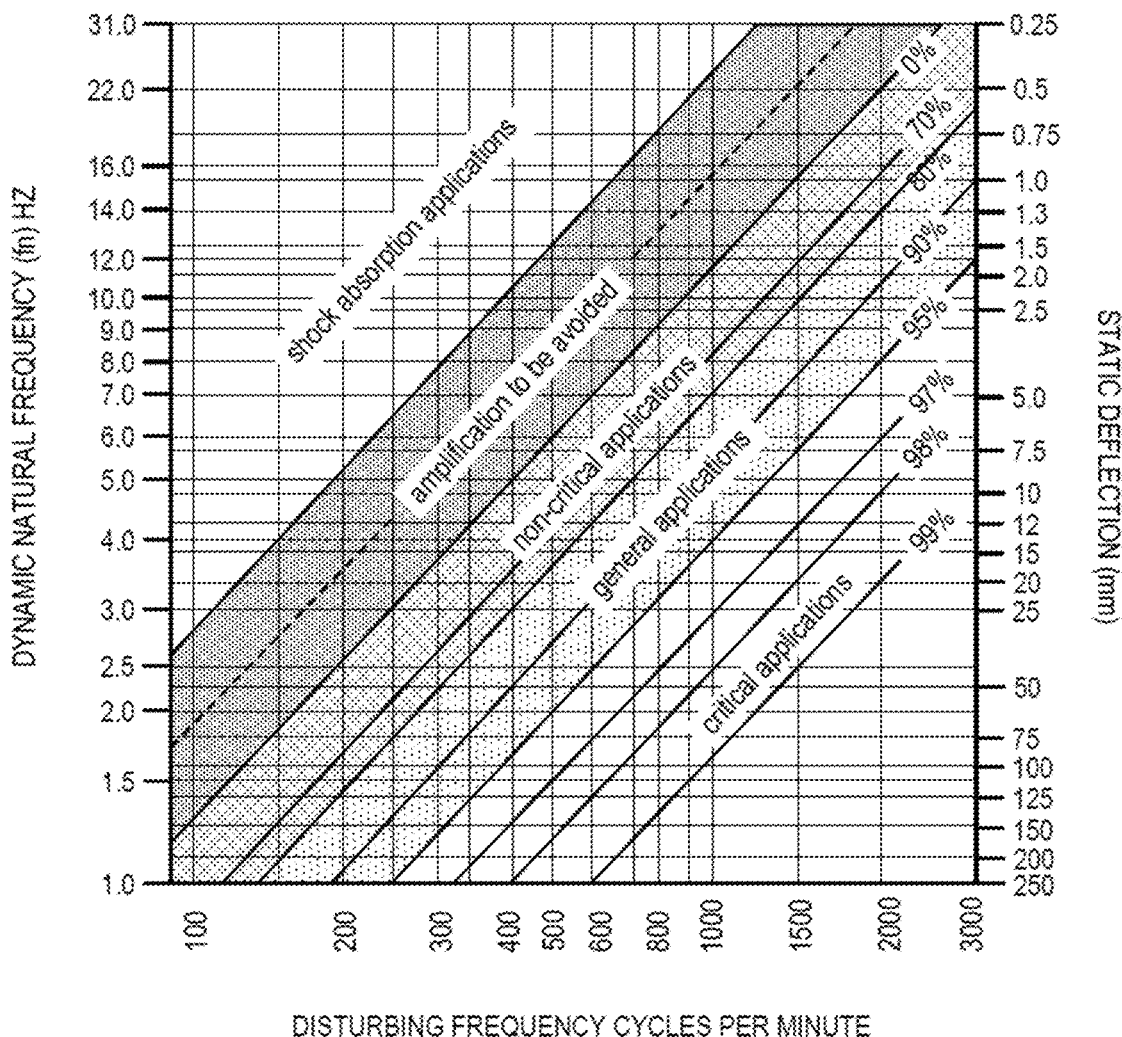
FIG. 32 is a graphical illustration of isolation efficiency data relating vibration frequently and static deflection.

The industry standard of 2.5 mm compression (or static deflection) is derived from Embelton's published *Isolation Efficiency Chart* (Embelton, http://vibration-isolation.embelton.com/isolation-efficiency-chart) (see FIG. 32) which is widely recognised as the industry benchmark. From the chart, we can see that 2.5 mm deflection in the 90% efficiency range of the 'General Applications' zone will attenuate frequencies from just below 200 Hz.

Figure 33:
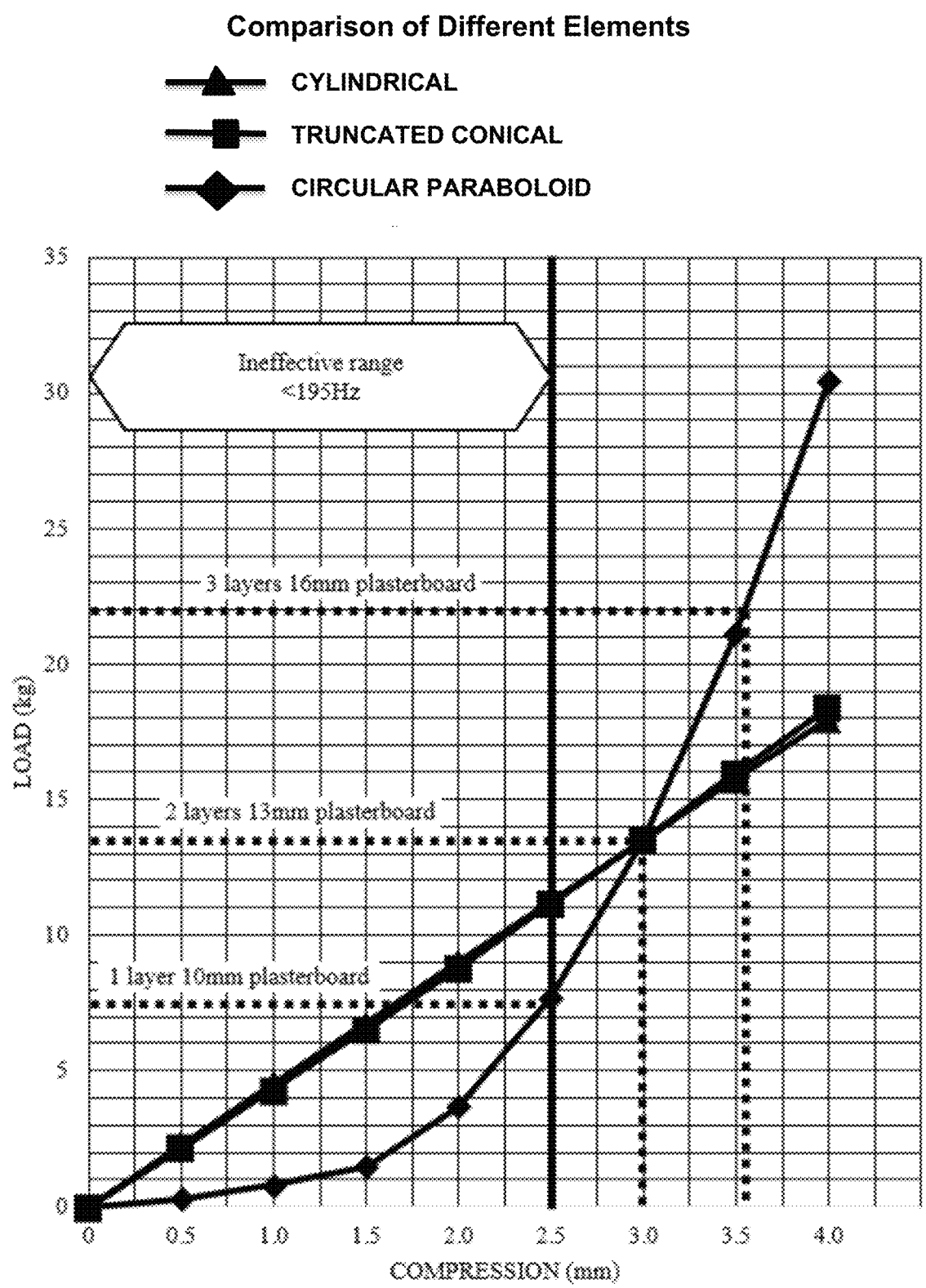
FIG. 33 is a graphical comparison of compression vs loading for the present invention compared to known resilient mounts.

To compare the three different designs, (known cylindrical element, known truncated conical element, circular paraboloid element of the invention) we can plot the curves on the same chart—see FIG. 33.

This comparison highlights the distinct advantage of using circular paraboloid designs over any other shape. Firstly, we can see that for very light mass loads such as a single layer of 10 mm plasterboard, the compression rate of the known designs falls inside the ineffective range of isolation efficiency (approx. 1.75 mm) whereas the compression rate of circular paraboloid design is within the effective range (approx. 2.55 mm).

This fact alone makes this present configuration possibly the only resilient mount commercially available that can effectively isolate low frequency noise with a single layer of plasterboard.

Secondly, we can see that at the assumed constant element (node) height of 4 mm, the known designs are not actually able to effectively support three layers of 16 mm plasterboard as the line in FIG. 33 titled '3 layers 16 mm plasterboard' and the linear plots do not actually cross at any point. The circular paraboloid design however is easily able to accommodate this common ceiling combination and still has excess capacity to accommodate additional fixtures such as light fittings, heavier insulation or ceiling-mounted signage.

This means that this present invention accommodates possibly the greatest range of ceiling combination weights of any resilient mount commercially available. Where other manufacturers require two products to cover this weight range, and in some cases three different products, this design would cover more than 95% of ceiling applications with one single resilient mount.

The unique functional features of the present invention using the preferred circular paraboloid design provide an opportunity to provide the building industry, acoustic engineers and architects with a singular product usable across almost all applications.

The possible configurations of an acoustic mount in FIGS. 25a-25c have the axial length of each damper element 20 greater than half of all transverse widths thereof. The damper elements have convex outer surface in all planes containing the axial direction A. In particular each damper element has a continuous convexity of its outer surface extending to a tip 22 which in use engages with the primary or secondary structure or with a building element 10 which is connected to the primary or secondary structure—in the illustrated assembly of FIG. 25d the building element 10 is a metal disc against which the tips 22 of the damper elements engage with the disc being located by a bolt 11 through the central bore 25 in the body and in use coupled directly or indirectly to the building structure as is well known in the building industry.

The acoustic mount in FIGS. 25a-25c can have its continuous convex outer surface 21 in a plane containing the axial direction A having a curved shape defined by a quadratic equation, including segments of ellipses, parabolas, hyperbolas. Preferably the convex outer surface is a quadric surface with the curved shape of the convex surface in multiple planes containing the axial direction being defined by quadratic functions. In particular the shape of each vibration damper element can be selected from ellipsoids, ellipsoids of revolution, elliptic paraboloids, paraboloids of revolution, elliptic hyperboloids, hyperboloids of revolution. However it may also be possible to have other shapes of damper elements provided those shapes have the identified parameters, e.g. the shape substantially may be or may approximate an exponential function in cross sections containing the axial direction, such as defined by a formula: $y=e^{kx}$ where k is a constant. We say that the shape may substantially be or may approximate this shape since one part of such an exponential function is asymptotic so some departure from the precise shape is needed. A particular example of a useable cross sectional shape is generated by the formula:

$$y = e^{\frac{x}{3}}$$

This is the general formula above applied with k=0.333 (or 0.3 recurring). FIG. 30b illustrates the profile cross section using this formula.

The acoustic mount in FIGS. 25a-25c shows the damper elements located atop respective damper columns 30 which extend in and are resiliently compressible in the axial direction A. There are multiple columns connected together with a damper element atop each of the columns projecting above regions where the columns are connected together.

The vibration damper 10 includes a main body 16 composed of resiliently compressible material and each damper element 20 projects in the axial direction A from the main body 16. The illustrated acoustic mount 15 has multiple damper elements 20 arranged in an array projecting from the main body as to engage in use with one of the primary and secondary structures or with one or more building elements 10,12 attached to one of the primary and secondary structures. Although not shown in the drawings, multiple damper elements 20 may include some having different axial lengths so that in use when there is no or little compressive load in the axial direction not all of the damper elements engage with the associated structure or building element, and so that when increased compressive load is applied a greater number of damper elements 20 engage with the structure or building element 10,12 as the axially longer damper elements compress.

As shown in the exploded view in FIG. 25c optionally the body 16 has projecting from a side opposite to the damper elements multiple supplementary damper elements 28 (shown shaded) to engage with one of the primary and secondary structures or with building elements 10,12 attached to one of the primary and secondary structures. The supplementary damper elements 28 have different shapes to the damper elements 20 including shapes selected from cylindrical, (including cylinders having triangular cross-section, square cross-section, rectangular cross-section, circular cross-section, elliptic cross-section and other polygonal cross-section), truncated conical, frusto-conical, hemispherical, and truncated hemispherical.

Figure 25E:
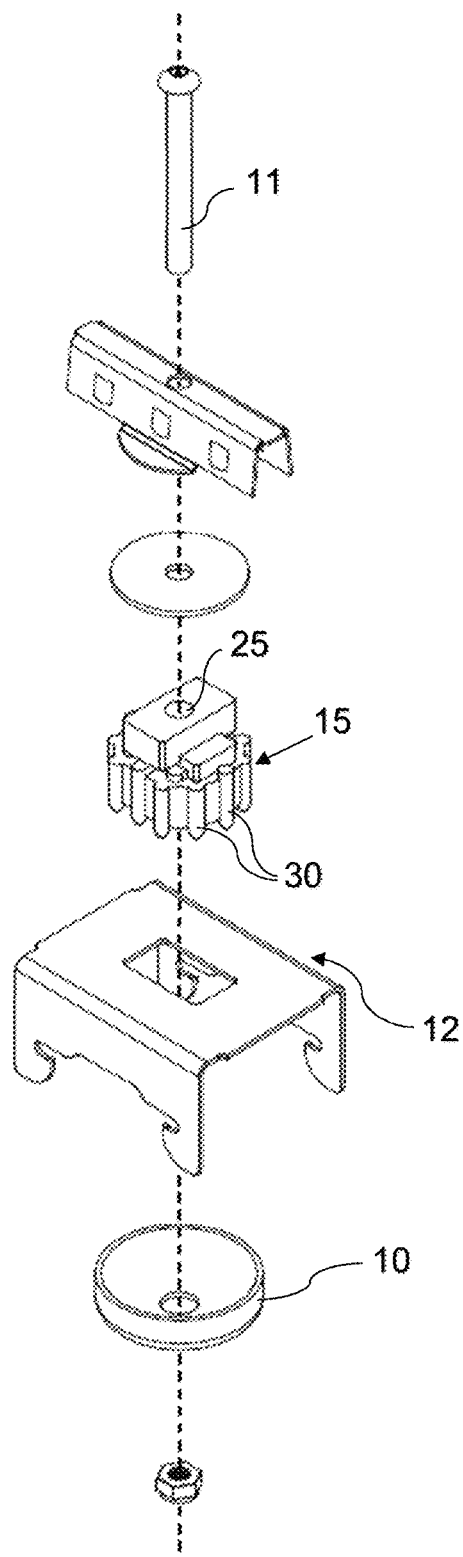
FIG. 25e is an exploded view of the assembly of FIG. 25d.

In FIG. 25c the rectangular head 17 is integral with the main body 16 although it is illustrated in exploded view only to enable the supplementary damper elements 28 to be clearly seen. The head 17 is passed through a similarly shaped hole in the support member 12, then the body is rotated 90° so that the head 17 prevents ready disassembly. In the assembly of FIG. 25d which is shown in exploded view in FIG. 25e for clarity, the acoustic mount 15 has the support member 112 to which the vibration damper is attached so that the support member extends laterally from the vibration damper relative to the axial direction A, the support member in use being connected to one of the primary and secondary structures and being separated from the other of the structures in the axial direction by the damper element of the acoustic mount.

The invention also provides a method of damping sound vibrations in a building travelling between a first structure of the building and a second structure of the building wherein the first and second structures are connected at a connecting point, the method including providing an acoustic mount as described above, locating the acoustic mount at the connecting point and fixing with a first fixing element the acoustic mount to the primary structure, fixing with a second fixing element the acoustic mount to the secondary structure so that the resiliently compressible damper elements are interposed between the primary and secondary structures and the respective first and second fixing elements so that vibrations in one of the structures is damped or isolated or at most is transmitted with substantial attenuation.

The invention also provides a building structure having means for damping sound vibrations travelling from the first structure of the building to a second structure of the building wherein the first and second structures are connected at connection points, said building structure having at each of the connecting points an acoustic mount installed.

Finally the invention also provides the vibration damper useable in the acoustic mount of the first or second aspect, the vibration damper being interposed in use between the primary and secondary structures so as to damp vibrations and thereby limit the transmission through the vibration damper of the vibrations in one of the structures to the other of the structures, the vibration damper being resiliently compressible in the axial direction and having the construction features described herein with reference to the drawings.

What is claimed is:

1. An acoustic mount for damping vibrations between a primary structure of a building and a secondary structure of a building in which the primary and secondary structures are mounted or coupled in use to each other whilst being separated from each other in an axial direction, the acoustic mount including:
   a vibration damper which is interposed in use between the primary and secondary structures so as to damp vibrations and thereby limit the transmission through the vibration damper of the vibrations in one of the structures to the other of the structures, the vibration damper being resiliently compressible in the axial direction;
   wherein the vibration damper has at least one resiliently compressible damper element which is elongated in the axial direction so that the axial length of the damper element is greater than half of a transverse width thereof;
   wherein the or each said at least one damper element reduces in cross sectional area in the axial direction;

wherein the or each said at least one damper element has a convex outer surface in planes containing the axial direction; and whereby the vibration damper possesses non-linear axial deflection or compression characteristics under a range of static loading conditions enabling effective vibration damping or vibration isolation for a substantial range of loadings of the acoustic mount in use.

2. An acoustic mount according to claim 1 wherein the axial length of the or each said at least one damper element is greater than half of all transverse widths thereof.

3. An acoustic mount according to claim 1 wherein the or each said at least one damper element has a convex outer surface in all planes containing the axial direction.

4. An acoustic mount according to claim 1 wherein the or each said at least one damper element has a continuous convexity of its outer surface extending to a tip which in use engages with the primary or secondary structure or with a building element which is connected to the primary or secondary structure.

5. An acoustic mount according to claim 4 wherein the continuous convex outer surface in a plane containing the axial direction has a curved shape defined by a quadratic equation, including segments of ellipses, parabolas, hyperbolas.

6. An acoustic mount according to claim 5 wherein the convex outer surface is a quadric surface with the curved shape of the convex surface in multiple planes containing the axial direction being defined by quadratic functions.

7. An acoustic mount according to claim 6 wherein the shape of the or each vibration damper element is selected from ellipsoids, ellipsoids of revolution, elliptic paraboloids, paraboloids of revolution, elliptic hyperboloids, hyperboloids of revolution.

8. An acoustic mount according to claim 4 wherein the continuous convex outer surface in a plane containing the axial direction has a curved shape substantially defined by the exponential function: $y=e^{kx}$, where e satisfies ln e=1, k is a constant.

9. An acoustic mount according to claim 8 wherein k=0.3 recurring so that the continuous convex outer surface in a plane containing the axial direction has a curved shape substantially defined by the exponential function:

$$y = e^{\frac{x}{3}}$$

10. An acoustic mount according to claim 1 wherein the or each damper element is located atop a damper column which extends in and is resiliently compressible in the axial direction.

11. An acoustic mount for damping vibrations between a primary structure of a building and a secondary structure of a building in which the primary and secondary structures are mounted or coupled in use to each other whilst being separated from each other in an axial direction, the acoustic mount including:

a vibration damper which is interposed in use between the primary and secondary structures so as to damp vibrations and thereby limit the transmission through the vibration damper of the vibrations in one of the structures to the other of the structures, the vibration damper being resiliently compressible in the axial direction;

wherein the vibration damper has at least one resiliently compressible damper element which is elongated in the axial direction so that the axial length of the damper element is greater than half of a transverse width thereof;

wherein the or each said at least one damper element reduces in cross sectional area in the axial direction;

wherein the or each said at least one damper element has a convex outer surface in planes containing the axial direction;

wherein the or each damper element is located atop a damper column which extends in and is resiliently compressible in the axial direction;

wherein there are multiple columns connected together with a damper element atop each of the columns projecting above regions where the columns are connected together; and whereby the vibration damper possesses non-linear axial deflection or compression characteristics under a range of static loading conditions enabling effective vibration damping or vibration isolation for a substantial range of loadings of the acoustic mount in use.

12. An acoustic mount according to claim 1 wherein the vibration damper includes a main body composed of resiliently compressible material and wherein said at least one damper element projects in the axial direction from the main body.

13. An acoustic mount according to claim 12 wherein there are multiple damper elements arranged in an array projecting from the main body as to engage in use with one of the primary and secondary structures or with one or more building elements attached to one of the primary and secondary structures.

14. An acoustic mount for damping vibrations between a primary structure of a building and a secondary structure of a building in which the primary and secondary structures are mounted or coupled in use to each other whilst being separated from each other in an axial direction, the acoustic mount including:

a vibration damper which is interposed in use between the primary and secondary structures so as to damp vibrations and thereby limit the transmission through the vibration damper of the vibrations in one of the structures to the other of the structures, the vibration damper being resiliently compressible in the axial direction;

wherein the vibration damper has at least one resiliently compressible damper element which is elongated in the axial direction so that the axial length of the damper element is greater than half of a transverse width thereof;

wherein the or each said at least one damper element reduces in cross sectional area in the axial direction;

wherein the or each said at least one damper element has a convex outer surface in planes containing the axial direction;

whereby the vibration damper possesses non-linear axial deflection or compression characteristics under a range of static loading conditions enabling effective vibration damping or vibration isolation for a substantial range of loadings of the acoustic mount in use;

wherein the vibration damper includes a main body composed of resiliently compressible material and wherein said at least one damper element projects in the axial direction from the main body;

wherein there are multiple damper elements arranged in an array projecting from the main body as to engage in use with one of the primary and secondary structures or with one or more building elements attached to one of the primary and secondary structures; and wherein the multiple damper elements include some having different axial lengths so that in use when there is no or little compressive load in the axial direction not all of the damper elements engage with the associated structure or building element, and so that when increased compressive load is applied a greater number of damper elements engage with the structure or building element as the axially longer damper elements compress.

15. An acoustic mount for damping vibrations between a primary structure of a building and a secondary structure of a building in which the primary and secondary structures are mounted or coupled in use to each other whilst being separated from each other in an axial direction, the acoustic mount including:
- a vibration damper which is interposed in use between the primary and secondary structures so as to damp vibrations and thereby limit the transmission through the vibration damper of the vibrations in one of the structures to the other of the structures, the vibration damper being resiliently compressible in the axial direction;
- wherein the vibration damper has at least one resiliently compressible damper element which is elongated in the axial direction so that the axial length of the damper element is greater than half of a transverse width thereof;
- wherein the or each said at least one damper element reduces in cross sectional area in the axial direction;
- wherein the or each said at least one damper element has a convex outer surface in planes containing the axial direction;
- whereby the vibration damper possesses non-linear axial deflection or compression characteristics under a range of static loading conditions enabling effective vibration damping or vibration isolation for a substantial range of loadings of the acoustic mount in use;
- wherein the vibration damper includes a main body composed of resiliently compressible material and wherein said at least one damper element projects in the axial direction from the main body; and
- wherein the body has projecting from a side opposite to the damper elements multiple supplementary damper elements to engage with one of the primary and secondary structures or with building elements attached to one of the primary and secondary structures.

16. An acoustic mount according to claim 15 wherein the supplementary damper elements have different shapes to said at least one damper element including shapes selected from cylindrical, including cylinders having triangular cross-section, square cross-section, rectangular cross-section, circular cross-section, elliptic cross-section and other polygonal cross-sections, truncated conical, frustoconical, hemispherical, and truncated hemispherical.

17. An acoustic mount according to claim 1 and further including a support member to which the vibration damper is attached so that the support member extends laterally from the vibration damper relative to the axial direction, the support member in use being connected to one of the primary and secondary structures and being separated from the other of the structures in the axial direction by at least one said damper element of the acoustic mount.

18. A method of damping sound vibrations in a building travelling between a first structure of the building and a second structure of the building wherein said first and second structures are connected at a connecting point, the method including providing an acoustic mount as claimed in claim 1, locating the acoustic mount at said connecting point and fixing with a first fixing element the acoustic mount to the primary structure, fixing with a second fixing element the acoustic mount to the secondary structure so that at least one said resiliently compressible damper element is interposed between the primary and secondary structures and the respective first and second fixing elements so that vibrations in one of the structures is damped or isolated or at most is transmitted with substantial attenuation.

19. A building structure having means for damping sound vibrations travelling from the first structure of the building to a second structure of the building wherein said first and second structures are connected at connection points, said building structure having at each of said connecting points an acoustic mount installed according to the method as claimed in claim 18.

20. A vibration damper useable in the acoustic mount of claim 1, the vibration damper being interposed in use between the primary and secondary structures so as to damp vibrations and thereby limit the transmission through the vibration damper of the vibrations in one of the structures to the other of the structures, the vibration damper being resiliently compressible in the axial direction;
- wherein the vibration damper has at least one resiliently compressible damper element which is elongated in the axial direction so that the axial length of the damper element is greater than a transverse width thereof;
- wherein the or each said at least one damper element reduces in cross sectional area in the axial direction;
- wherein the or each said at least one damper element has a convex outer surface in planes containing the axial direction; and
- whereby the vibration damper possesses non-linear axial deflection or compression characteristics under a range of static loading conditions enabling effective vibration damping or vibration isolation for a substantial range of loadings of the acoustic mount in use.

\* \* \* \* \*